US012152160B2

(12) United States Patent
Asahi et al.

(10) Patent No.: US 12,152,160 B2
(45) Date of Patent: Nov. 26, 2024

(54) COATING AGENT COMPOSITION, SURFACE TREATMENT METHOD AND ARTICLE

(71) Applicant: SHIN-ETSU CHEMICAL CO., LTD., Tokyo (JP)

(72) Inventors: Tomoyuki Asahi, Annaka (JP); Yasunori Sakano, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 255 days.

(21) Appl. No.: 17/764,600

(22) PCT Filed: Sep. 17, 2020

(86) PCT No.: PCT/JP2020/035225
§ 371 (c)(1),
(2) Date: Mar. 29, 2022

(87) PCT Pub. No.: WO2021/065537
PCT Pub. Date: Apr. 8, 2021

(65) Prior Publication Data
US 2023/0014516 A1  Jan. 19, 2023

(30) Foreign Application Priority Data
Sep. 30, 2019 (JP) ................................ 2019-179803

(51) Int. Cl.
C09D 171/00   (2006.01)
C08G 65/00    (2006.01)
C08G 65/336   (2006.01)
C09D 5/16     (2006.01)
C09D 7/20     (2018.01)
C09D 171/02   (2006.01)
C09K 3/18     (2006.01)

(52) U.S. Cl.
CPC ......... C09D 171/00 (2013.01); C08G 65/007 (2013.01); C08G 65/336 (2013.01); C09D 5/16 (2013.01); C09D 7/20 (2018.01); C09D 171/02 (2013.01); C09K 3/18 (2013.01); C08G 2150/00 (2013.01); C08G 2650/04 (2013.01); C08G 2650/48 (2013.01); C08L 2205/02 (2013.01)

(58) Field of Classification Search
CPC .. C09D 171/00; C09D 171/02; C08G 65/007; C08G 65/336; C08L 2205/02; C08L 2205/025
See application file for complete search history.

(56) References Cited

U.S. PATENT DOCUMENTS

| 9,340,705 | B2 * | 5/2016  | Yamane        | C09D 183/12 |
| 2003/0139620 | A1 | 7/2003  | Yamaguchi et al. | |
| 2010/0076211 | A1 | 3/2010  | Yamane et al. | |
| 2012/0270057 | A1 | 10/2012 | Yamane et al. | |
| 2013/0108876 | A1 * | 5/2013  | Komori        | C08L 71/02 428/421 |
| 2014/0113145 | A1 | 4/2014  | Yamane et al. | |
| 2015/0275035 | A1 * | 10/2015 | Yamane        | C03C 17/30 428/447 |
| 2016/0040039 | A1 | 2/2016  | Yamane et al. | |

FOREIGN PATENT DOCUMENTS

| JP | 2003-238577 A | 8/2003 |
| JP | 2010-47516 A  | 3/2010 |
| JP | 2011-178835 A | 9/2011 |
| JP | 2012-233157 A | 11/2012 |
| JP | 2014-84405 A  | 5/2014 |
| JP | 2016-37541 A  | 3/2016 |
| JP | 6777212 B1    | 10/2020 |
| WO | WO 2010/101091 A1 | 9/2010 |
| WO | WO 2015/190526 A1 | 12/2015 |
| WO | WO 2019/049753 A1 | 3/2019 |

OTHER PUBLICATIONS

International Search Report, issued in PCT/JP2020/035225, dated Dec. 1, 2020.
Written Opinion of the International Searching Authority, issued in PCT/JP2020/035225, dated Dec. 1, 2020.

* cited by examiner

Primary Examiner — Marc S Zimmer
(74) Attorney, Agent, or Firm — Birch, Stewart, Kolasch & Birch, LLP

(57) ABSTRACT

The present invention enables the achievement of a coating agent composition which contains a perfluoropolyether compound (A) of a specific structure, and dissolves into at least one volatile organic solvent that does not contain a fluorine atom without using a fluorine-containing solvent having a boiling point of 260° C. or less at atmospheric pressure by setting the content ratio of a non-functional perfluoropolyether compound (B) relative to a total of 100% by mole of the component (A) and the component (B) to less than 2.5% by mole, while forming a cured coating film by being rapidly cured on a base material, said cured coating film firmly adhering to the base material and exhibiting excellent water repellent oil repellent properties, sliding properties, mold releasability and the like.

12 Claims, No Drawings

COATING AGENT COMPOSITION, SURFACE TREATMENT METHOD AND ARTICLE

TECHNICAL FIELD

The present invention relates to a coating agent composition; a method for treating a surface of an article, including the step of treating the surface of the article by a dry coating method or a wet coating method using the coating agent composition; and an article having a surface subjected to anti-fouling treatment with the coating agent composition.

BACKGROUND ART

In recent years, touch panels have been increasingly adopted for screens including those of mobile phone displays. However, in many touch panels, screens are exposed, and thus often come into direct contact with fingers, cheeks and the like, leading to the problem of being easily stained with sebum and the like. Thus, demand for a technique for reducing the possibility of attachment of fingerprints to a surface of a display in order to improve the appearance and visibility, and a technique for facilitating removal of stains has been rising year by year.

In general, fluorooxyalkylene group-containing compounds are known to have a water/oil-repellent property, chemical resistance, lubricity, mold releasability, an anti-fouling property and the like because of its very small surface free energy. Owing to the above-mentioned properties, fluorooxyalkylene group-containing compounds are widely industrially used for water/oil-repellent and anti-fouling agents for paper and fiber, lubricants for magnetic recording media, anti-oil agents for precision devices, mold release agents, cosmetics, protective films and the like. However, since the fluorooxyalkylene group-containing compound has poor tackiness and adhesion to other substrates, a film including a cured product of a composition containing the compound is difficult to attach to a substrate.

In addition, a silane coupling agent is known as an additive for bonding a surface of a substrate surface such as glass or cloth to an organic compound, and is widely used as an additive contained in a coating agent on surfaces of various substrates. The silane coupling agent is a compound having an organic functional group and a reactive silyl group (generally an alkoxysilyl group) per molecule. The alkoxysilyl group undergoes a self-condensation reaction under moisture in the air or the like. In a film obtained by curing a coating agent, the alkoxysilyl group is chemically and physically bonded to a surface of glass, metal or the like to obtain a robust film having durability.

Patent Document 1 (JP-A 2003-238577) discloses a perfluorooxyalkylene group-containing polymer-modified silane having a linear perfluorooxyalkylene group as a compound having a fluorooxyalkylene group and an alkoxysilyl group. By treating a glass surface with a cured product of a surface treatment agent containing the perfluorooxyalkylene group-containing polymer-modified silane, excellent slipperiness, mold releasability and abrasion resistance can be imparted to the glass surface.

On the other hand, the fluoroalkylene group-containing compound disclosed in Patent Document 1 has low solubility in a non-fluorine-based organic solvent, and therefore is diluted with a fluorine-containing organic solvent when used as a surface treatment agent, but in recent years, use of fluorine-containing solvents has tended to be avoided because of environmental concerns, concerns about the health of operators, and the necessity of dedicated excluding equipment different from that for general organic solvents are for safe handling, and development of a water-repellent/oil-repellent treatment agent (surface treatment agent) capable of imparting excellent properties to a surface of a cured product without using a fluorine-containing agent is required.

PRIOR ART DOCUMENTS

Patent Documents

Patent Document 1: JP-A 2003-238577
Patent Document 2: JP-A 2012-233157

SUMMARY OF INVENTION

Technical Problem

The present invention has been made in view of the above-described circumstances, and an object of the present invention is to provide a coating agent composition containing a perfluoropolyether compound having excellent solubility in at least one non-fluorine-based organic solvent; a method for treating a surface of an article, including the step of treating the surface of the article by a dry coating method or a wet coating method using the coating agent composition; and an article having a surface subjected to anti-fouling treatment with the coating agent composition.

Solution to Problem

The present inventors have extensively conducted studies for achieving the above-described object, and resultantly found that when perfluoropolyether compound (A) having a specific structure as described later is contained, and the content ratio of a nonfunctional perfluoropolyether compound (B) is less than 2.5 mol % per a total of 100 mol % of the component (A) and the component (B), it is possible to obtain a coating agent composition which is dissolved in at least one volatile organic solvent free of a fluorine atom without using a fluorine-containing solvent having a boiling point of 260° C. or lower at normal pressure (1 atm), is rapidly cured on a substrate and firmly attached to the substrate to form a cured film excellent in water/oil-repellent property, lubricity, mold releasability and the like. In this way, the present invention has been completed.

Accordingly, the present invention provides the following coating agent composition, surface treatment method and article.

[1]
A coating agent composition comprising a perfluoropolyether compound (A) of the following general formula (1):

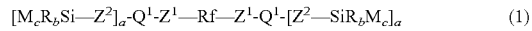  (1)

wherein Rf is a divalent perfluoropolyether group having a numerical average molecular weight of 1,500 to 20,000;
each $Z^1$ is independently a divalent linking group, optionally contains an oxygen atom, a nitrogen atom, a fluorine atom or a silicon atom, and may be a group having a cyclic structure and/or an unsaturated bond;
each $Z^2$ is independently a divalent hydrocarbon group having 2 to 20 carbon atoms, may have a cyclic structure, and optionally contains an intermediate ether bond (—O—);
each $Q^1$ is independently a linking group with a valence of (a+1), and may have cyclic structure, the linking group having a siloxane structure with at least (a+1) silicon atoms, an unsubstituted or halogen-substituted silalkylene structure, a silarylene structure, or a combination of two or more thereof;

each a is independently an integer of 1 to 10, each b is independently an integer of 0 to 2, each c is independently an integer of 1 to 3, and b and c on one silicon atom satisfy b+c=3; all "a" number of $Z^2$ in the square bracket in formula (1) are bonded to the silicon atom in the $Q^1$ structure;

each R is independently a monovalent hydrocarbon group having 1 to 6 carbon atoms; and each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group; and a perfluoropolyether compound (B) of the following general formula (2):

$$F\text{—}Rf'\text{—}F \quad (2)$$

wherein Rf' is a divalent perfluoropolyether group having a numerical average molecular weight of 1,500 to 20,000;

wherein the content ratio of the perfluoropolyether compound (B) is less than 2.5 mol % per a total of 100 mol % of the component (A) and the component (B), and the content of a fluorine-containing solvent having a boiling point of 260° C. or lower at normal pressure is less than 1 wt % with respect to the entire composition.

[2]
The coating agent composition according to [1], wherein the content of the perfluoropolyether compound (A) is 0.005 to 80 wt % with respect to the entire composition, the content ratio of the perfluoropolyether compound (B) is less than 1.5 parts by weight per a total of 100 parts by weight of the perfluoropolyether compound (A) and the perfluoropolyether compound (B), and the balance is a volatile organic solvent (C) free of a fluorine atom.

[3]
The coating agent composition according to [1] or [2], wherein in formulae (1) and (2), Rf and Rf' each include a repeating unit having at least one structure selected from the group of the following divalent perfluoroether groups:

—CF$_2$O—;

—CF$_2$CF$_2$O—;

—CF$_2$CF$_2$CF$_2$O—;

—CF(CF$_3$)CF$_2$O—;

—CF$_2$CF$_2$CF$_2$CF$_2$O—;

—CF$_2$CF$_2$CF$_2$CF$_2$CF$_2$O—; and

—CF$_2$CF$_2$CF$_2$CF$_2$CF$_2$CF$_2$O—, and a perfluoroalkylene group having 1 to 6 carbon atoms.

[4]
The coating agent composition according to any one of [1] to [3], wherein in formulae (1) and (2), Rf and Rf' are each having one of:

—CF$_2$O(CF$_2$O)$_p$(CF$_2$CF$_2$O)$_q$CF$_2$— and

—CF$_2$CF$_2$O(CF$_2$O)$_p$(CF$_2$CF$_2$O)$_q$CF$_2$CF$_2$— wherein p is an integer of 10 to 290, q is an integer of 5 to 170, and p+q is an integer of 15 to 295; the sequence of the repeating units of —CF$_2$O— and —CF$_2$CF$_2$O— is random; and —CF(CF$_3$)[OCF$_2$CF(CF$_3$)]$_s$O(C$_u$F$_{2u}$O)$_v$[CF(CF$_3$)CF$_2$O]$_t$CF(CF$_3$)— and —CF$_2$CF$_2$CF$_2$O[CF(CF$_3$)CF$_2$O]$_t$CF$_2$CF$_2$— wherein each of s and t is independently an integer of 1 to 120, s+t is an integer of 4 to 121, u is an integer of 1 to 6, and v is an integer of 0 to 10.

[5]
The coating agent composition according to any one of [1] to [4], wherein in formula (1), $Z^2$ has the following formula: —(CH$_2$)$_w$—
wherein w is an integer of 2 to 20.

[6]
The coating agent composition according to any one of [1] to [5], wherein in formula (1), $Q^t$ is a cyclic siloxane structure.

[7]
The coating agent composition according to any one of [1] to [6], wherein in formula (1), $Z^t$ is one selected from

—CH$_2$CH$_2$—;

—CH$_2$CH$_2$CH$_2$—;

—CH$_2$CH$_2$CH$_2$CH$_2$—;

—CH$_2$OCH$_2$CH$_2$—; and

—CH$_2$OCH$_2$CH$_2$CH$_2$—

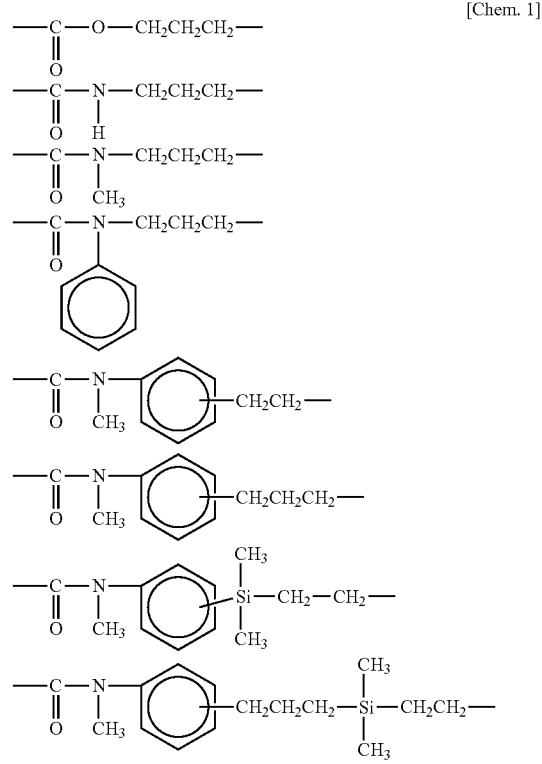

[Chem. 1]

-continued

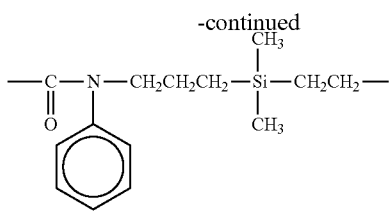

[8]
The coating agent composition according to any one of [2] to [7], wherein the volatile organic solvent (C) free of a fluorine atom contains a nonpolar hydrocarbon-based solvent.

[9]
The coating agent composition according to any one of [2] to [8], wherein the volatile organic solvent (C) free of a fluorine atom has a boiling point of 30 to 200° C. at normal pressure.

[10]
The coating agent composition according to any one of [1] to [9], wherein the coating agent composition gives a cured film having a water contact angle of 100° or more.

[11]
A method for treating a surface of an article, including the step of treating the surface of the article by a dry coating method or a wet coating method using the coating agent composition according to any one of [1] to [10].

[12]
An article having a surface subjected to anti-fouling treatment with the coating agent composition according to any one of [1] to [10].

Advantageous Effects of Invention

A perfluoropolyether compound contained in a coating agent composition of the present invention is soluble in a non-fluorine-based organic solvent, and a surface treatment agent using the coating agent composition is rapidly cured on a substrate, and firmly attached to the substrate to form a coating film excellent in water/oil-repellent property, slipperiness, mold releasability and the like.

DESCRIPTION OF EMBODIMENTS

Hereinafter, the present invention is described in detail.
[Component (A)]
A perfluoropolyether compound (A) which is a first component constituting the present invention can have the following general formula (1).

$$[M_cR_bSi—Z^2]_a\text{-}Q^1\text{-}Z^1—Rf—Z^1\text{-}Q^1\text{-}[Z^2—SiR_bM_c]_a \quad (1)$$

Here, in the above formula (1), Rf is a divalent perfluoropolyether group having a numerical average molecular weight of 1,500 to 20,000, and as long as the numerical average molecular weight falls within this range, compounds having a larger or smaller molecular weight may be contained. In the present invention, the numerical average molecular weight can be determined by calculation from a ratio between an end structure and a repeating unit structure which are obtained from a $^{19}$F-NMR spectrum (the same applies hereinafter).

In the above formula, Rf is a divalent perfluoropolyether group which is composed of a perfluoroalkylene group having 1 to 6 carbon atoms and an oxygen atom and which has a molecular weight of 1,500 to 20,000, preferably 2,000 to 18,000, more preferably 3,000 to 10,000, specifically Rf is a divalent perfluoropolyether group composed of a repeating unit having one or more of the following structures and a perfluoroalkylene group having 1 to 6 carbon atoms.

—CF$_2$O—

—CF$_2$CF$_2$O—

—CF$_2$CF$_2$CF$_2$O—

—CF(CF$_3$)CF$_2$O—

—CF$_2$CF$_2$CF$_2$CF$_2$O—

—CF$_2$CF$_2$CF$_2$CF$_2$CF$_2$O—

—CF$_2$CF$_2$CF$_2$CF$_2$CF$_2$CF$_2$O—

Those having any of the following perfluorooxyalkylene structures having 1 to 4 carbon atoms as a main repeating unit are particularly suitable.

—CF$_2$O—

—CF$_2$CF$_2$O—

—CF(CF$_3$)CF$_2$O—

—CF$_2$CF$_2$CF$_2$O—

—CF$_2$CF$_2$CF$_2$CF$_2$O—

As the perfluoroalkylene group having 1 to 6 carbon atoms, those shown below can be exemplified.

—CF$_2$—

—CF$_2$CF$_2$—

—CF(CF$_3$)—

—CF$_2$CF$_2$CF$_2$—

—CF(CF$_3$)CF$_2$—

—CF$_2$CF$_2$CF$_2$CF$_2$—

Examples of the particularly preferred structure of Rf include the following four structures.

—CF$_2$O(CF$_2$O)$_p$(CF$_2$CF$_2$O)$_q$CF$_2$—

—CF$_2$CF$_2$O(CF$_2$O)$_p$(CF$_2$CF$_2$O)$_q$CF$_2$CF$_2$—

(wherein p is an integer of 10 to 290, preferably 15 to 90, more preferably 20 to 60, q is an integer of 5 to 170, preferably 10 to 120, more preferably 15 to 50, p+q is an integer of 15 to 295, preferably 20 to 210, more preferably 30 to 100, and the combination of p and q is in a range which ensures that the numerical average molecular weight of Rf as the whole component (A) is 1,500 to 20,000; and the sequence of the repeating units of —CF$_2$O— and —CF$_2$CF$_2$O— is random.)

—CF(CF$_3$)[OCF$_2$CF(CF$_3$)]$_s$O(C$_u$F$_{2u}$O)$_v$[CF(CF$_3$)CF$_2$O]$_t$CF(CF$_3$)—

—CF$_2$CF$_2$CF$_2$O[CF(CF$_3$)CF$_2$O]$_t$CF$_2$CF$_2$—

(wherein each of a and t is an integer of 1 to 120, preferably 2 to 60, more preferably 4 to 20, s+1 is an integer of 4 to 121, preferably 4 to 100, more preferably 8 to 80, u is an integer of 1 to 6, preferably 2 to 4, and v is 0 to 10, preferably 0 to 4; and the combination of s, t, u and v is in a range which ensures that the numerical average molecular weight of Rf as the whole component (A) is 1,500 to 20,000.)

In the above formula (1), each $Z^1$ is independently a divalent linking group, and optionally contains an oxygen atom, a nitrogen atom, a fluorine atom or a silicon atom, and may be a group having a cyclic structure and/or an unsaturated bond. Specific examples of such a structure include the following structures. In the following structure, it is preferable that the left dangling bond is bonded to Rf and the right bond is bonded to a silicon atom in $Q^1$.

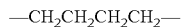

[Chem. 2]

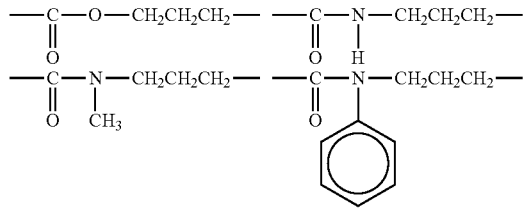

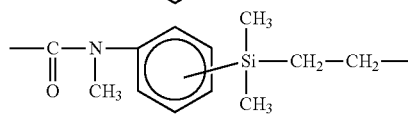

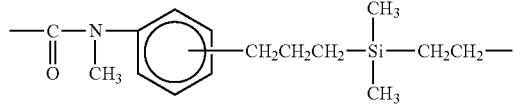

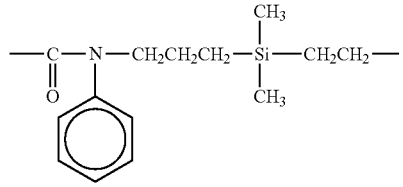

In the above formula (1), each a is independently an integer of 1 to 10, preferably an integer of 1 to 8, more preferably an integer of 1 to 4.

Each $Q^1$ is a linking group with a valence of (a+1), and may have a cyclic structure, the linking group having a siloxane structure with at least (a+1) number of silicon atoms, an unsubstituted or halogen-substituted silalkylene structure, a silarylene structure, or a combination of two or more thereof.

As such $Q^1$, specifically the following structures can be exemplified.

[Chem. 3]

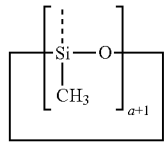

[Chem. 4]

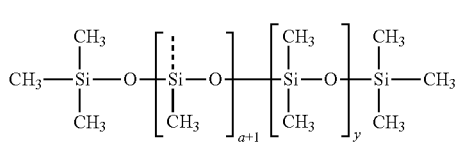

[Chem. 5]

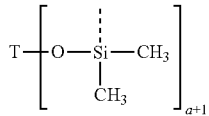

(wherein a dashed-line dangling bond is bonded to $Z^1$ or $Z^2$, and a is the same as a in the above formula (1), and each a is independently an integer of 1 to 10, preferably an integer of 1 to 8, more preferably an integer of 1 to 4; and y is an integer of 0 to 5, preferably an integer of 1 to 3.)

Here, T is a linking group with a valence of (a+1), and examples thereof include the following.

[Chem. 6]

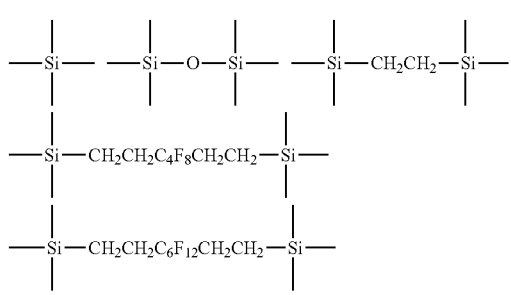

Examples of $Q^1$ include the following structures.

[Chem. 7]

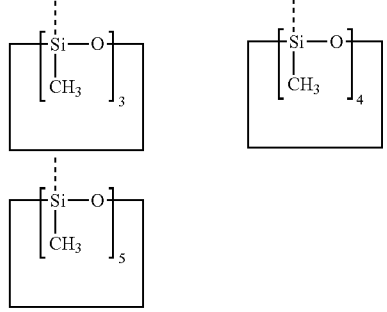

[Chem. 8]

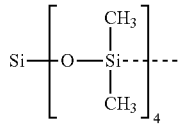

-continued

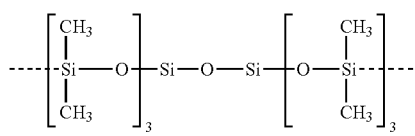

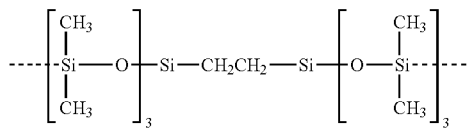

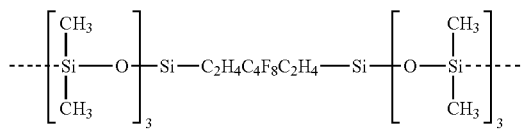

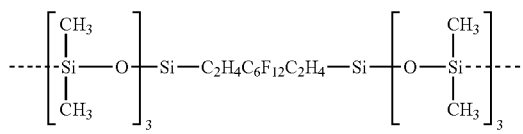

Among Q¹s above, cyclic siloxane structures are preferable, and the following structures are particularly preferable.

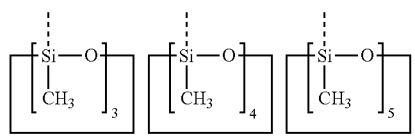

In the above formula (1), each $Z^2$ is independently a divalent hydrocarbon group having 2 to 20 carbon atoms, and may have a cyclic structure or may contain an intermediate ether bond (—O—).

Specific examples thereof include groups of the following formulae. In the following structure, it is preferable that the left dangling bond is bonded to a silicon atom in Q¹ and the right dangling bond is bonded to a silicon atom bonded to R or M.

—(CH$_2$)$_w$—   —CH$_2$CH$_2$CH$_2$OCH$_2$CH$_2$CH$_2$—

—CH$_2$CH$_2$CH$_2$OCH$_2$CH$_2$OCH$_2$CH$_2$CH$_2$—

—CH$_2$CH$_2$CH$_2$OCH$_2$CH$_2$OCH$_2$CH$_2$OCH$_2$CH$_2$CH$_2$—

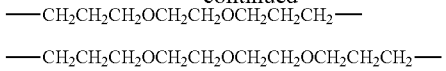

(wherein w is an integer of 2 to 20.)

$Z^2$ is particularly preferably

—(CH$_2$)$_w$—, more preferably one in which w is an integer of 3 to 12 in the above formula.

Here, in formula (1), all "a" number of $Z^2$ in the square bracket are bonded to the silicon atom in the Q¹ structure.

In the above formula (1), each R is independently a monovalent hydrocarbon group having 1 to 6 carbon atoms, preferably 1 to 4 carbon atoms. Specific examples of the monovalent hydrocarbon group include alkyl groups such as a methyl group, an ethyl group, a propyl group, an isopropyl group, a butyl group, an isobutyl group, a tert-butyl group, a pentyl group, a neopentyl group and a hexyl group; cycloalkyl groups such as a cyclohexyl group; alkenyl groups such as a vinyl group, an allyl group and a propenyl group; and phenyl groups, and a methyl group is particularly preferable.

In the above formula (1), each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group. Examples of M include alkoxy groups having preferably 1 to 6 carbon atoms, such as a methoxy group, an ethoxy group, a propoxy group and an isopropoxy group; alkoxyalkyl groups having preferably 2 to 4 carbon atoms, such as a methoxymethyl group, a methoxyethyl group, an ethoxymethyl group and an ethoxyethyl group; alkoxyalkoxy groups having preferably 2 to 4 carbon atoms, such as a methoxymethoxy group, a methoxyethoxy group, an ethoxymethoxy group and an ethoxyethoxy group; acyloxy groups having preferably 1 to 7 carbon atoms, such as an acetoxy group; alkenyloxy groups having preferably 2 to 6 carbon atoms, such as an isopropenoxy group; and halogen groups such as a chloro group, a bromo group and an iodo group. Among these groups, a methoxy group, an ethoxy group and a methoxymethyl group are particularly suitable.

In the above formula (1), each b is independently an integer of 0 to 2, preferably 0 or 1, each c is independently an integer of 1 to 3, preferably 2 or 3, and b and c on one silicon atom satisfy b+c=3.

Examples of the generalized structure as the component (A) include the following structures.

[Chem. 15]
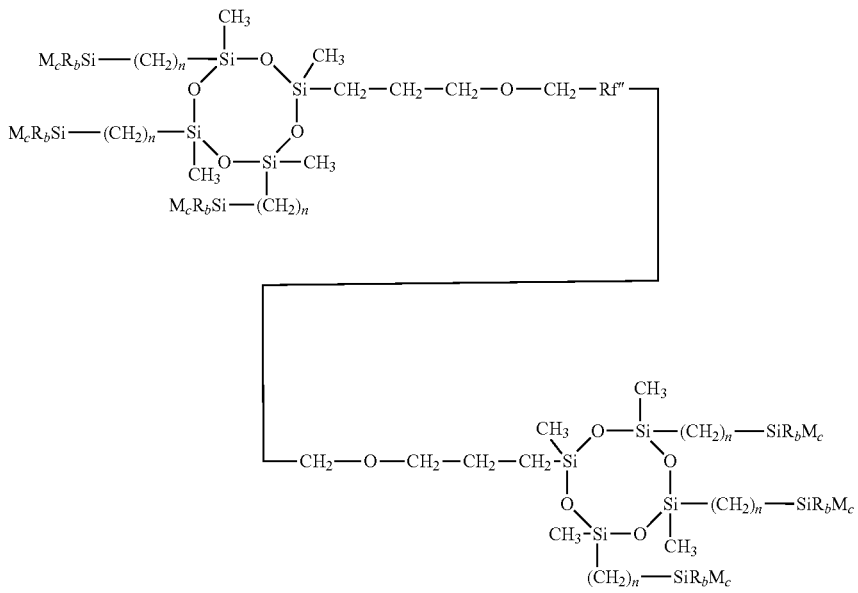
[Chem. 16]
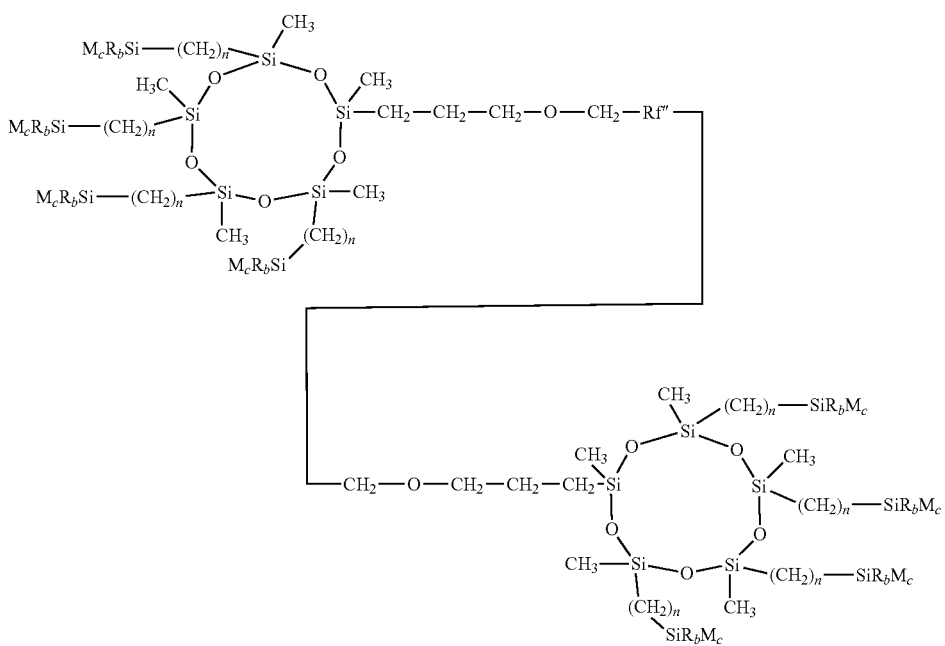
[Chem. 17]
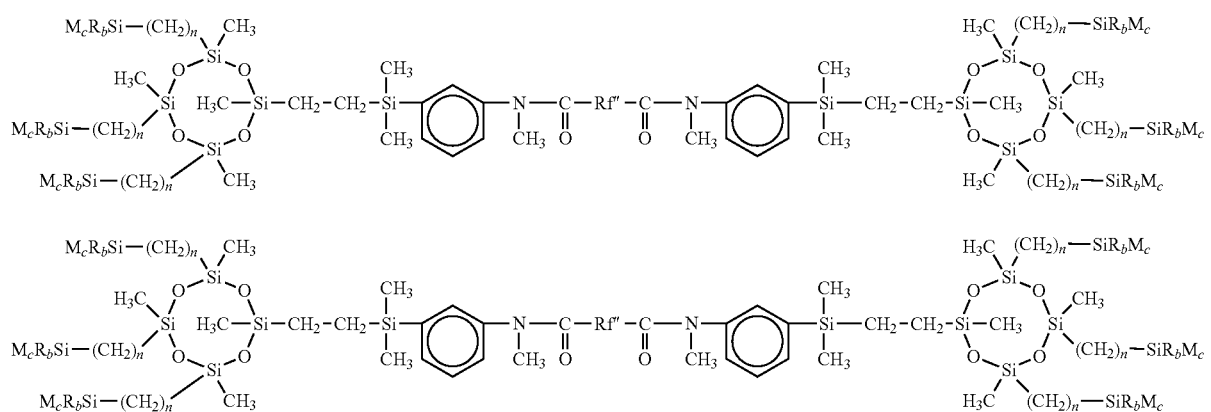

-continued

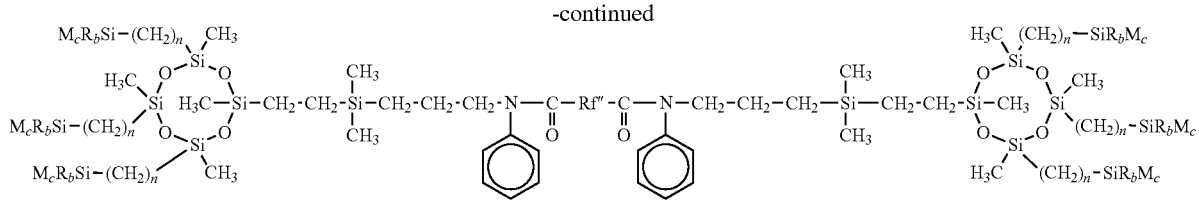

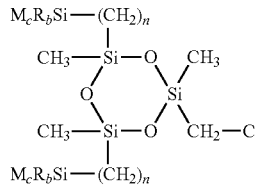 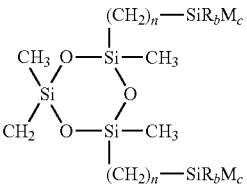

[Chem. 18]

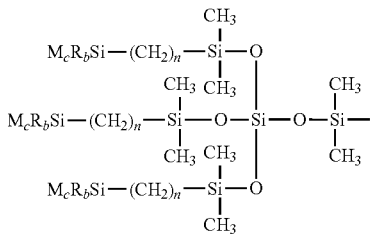 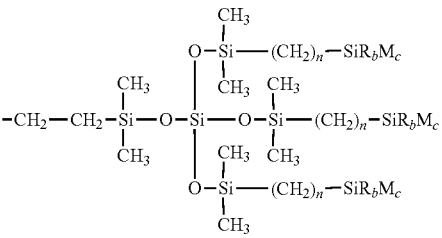

[Chem. 19]

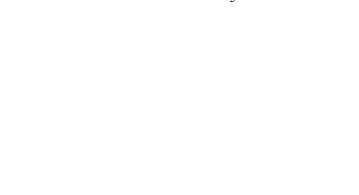 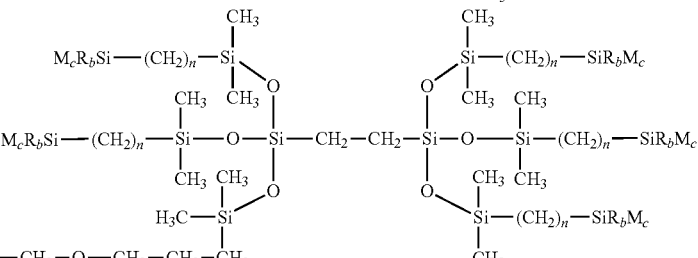

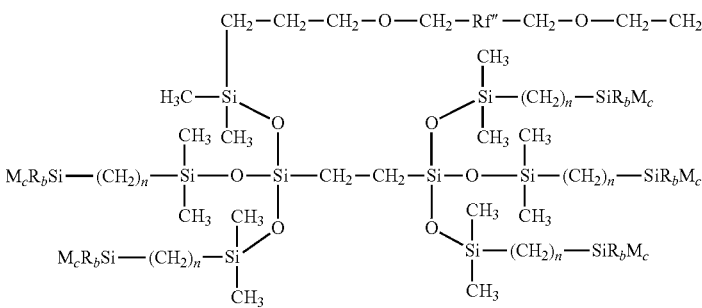

wherein R, M, b, c and b+c are as described above, Rf" is —CF$_2$O(CF$_2$O)$_{p1}$(CF$_2$CF$_2$O)$_{q1}$CF$_2$—, p1 is an integer of 10 to 300, q1 is an integer of 5 to 170, q1+p1 is a number of 15 to 470, and the sequence of the repeating units of —CF$_2$O— and —CF$_2$CF$_2$O— is random; Rf‴ is a group of the following formula:

[Chem. 21]

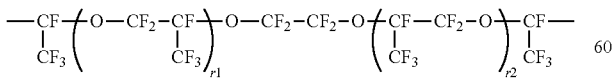

each of r1 and r2 is an integer of 2 to 60, preferably 4 to 20, and r1+r2 is a number of 4 to 120; each n is independently an integer of 2 to 20, preferably 3 to 10.)

Further, particularly desirable structures include the following structures.

[Chem.22]
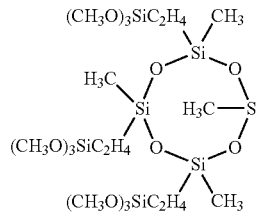 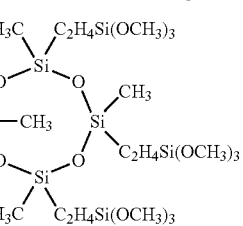
[Chem.23]
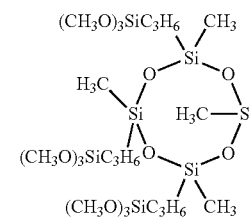 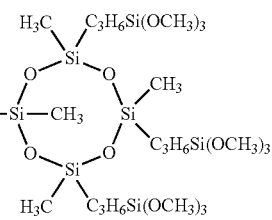
[Chem.24]
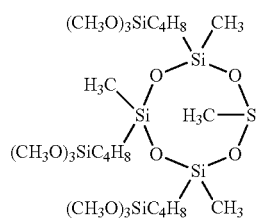 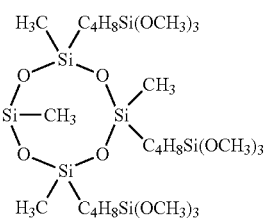
[Chem.25]
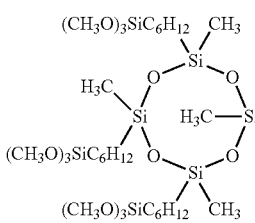 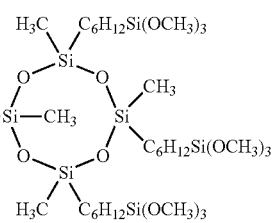
[Chem.26]
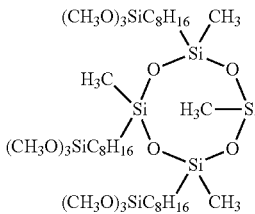 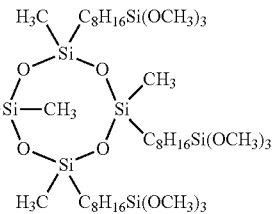
[Chem.27]
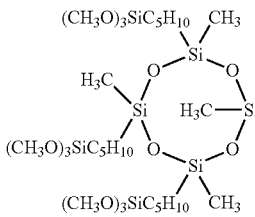 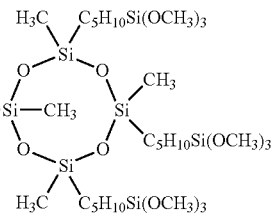

[Chem. 28]

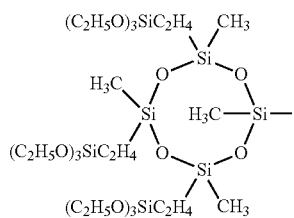 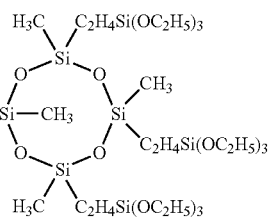

[Chem. 29]

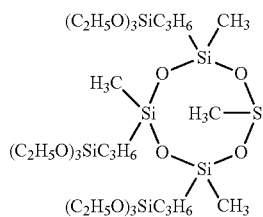 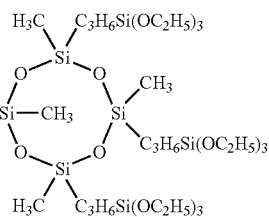

(wherein Rf' is as described above, and as Rf", one having a molecular weight of 1,500 to 18,000 is particularly desirable.)

The perfluoropolyether compound as the component (A) can be obtained by, for example, subjecting a known perfluoropolyether compound of the following general formula (3), which has "2a" number of (polyfunctional) Si—H groups, to an addition reaction with a terminally unsaturated group-containing reactive silane compound of the following general formula (4) by hydrosilylation.

$$[H]_a\text{-}Q^1\text{-}Z^1\text{—}Rf\text{—}Z^1\text{-}Q^1\text{-}[H]_a \quad (3)$$

(wherein Rf, $Z^1$, $Q^1$ and a are as described above.)

$$CH_2=CR^2\text{—}(Z^3)_x\text{-}SiR_bM_c \quad (4)$$

(wherein R, M, b, c and b+c are as described above, x is 0 or 1, and $Z^3$ is a divalent hydrocarbon group having 1 to 18 carbon atoms, may have a cyclic structure, and optionally contains an intermediate ether bond (—O—); and $R^2$ is a hydrogen atom or a monovalent hydrocarbon group having 1 to 10 carbon atoms, and the total number of carbon atoms in $Z^3$ and $R^2$ is 0 to 18, preferably 1 to 10.)

Here, as the perfluoropolyether compound of the above formula (3) which has a polyfunctional Si—H group, those shown below can be exemplified.

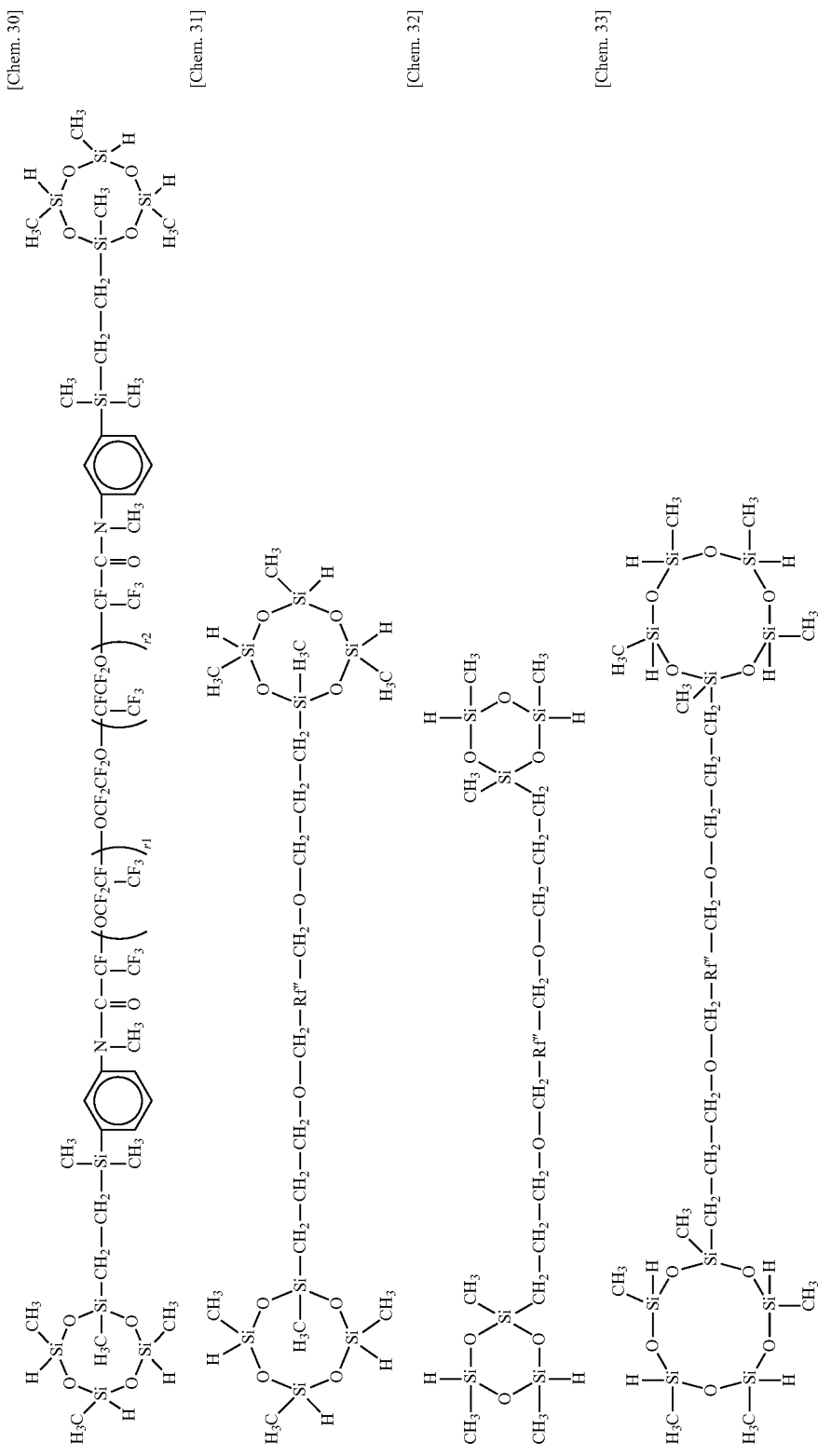

[Chem. 34]
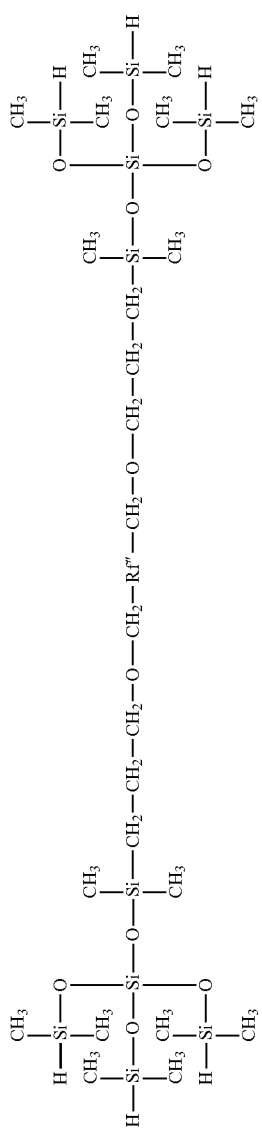
[Chem. 35]
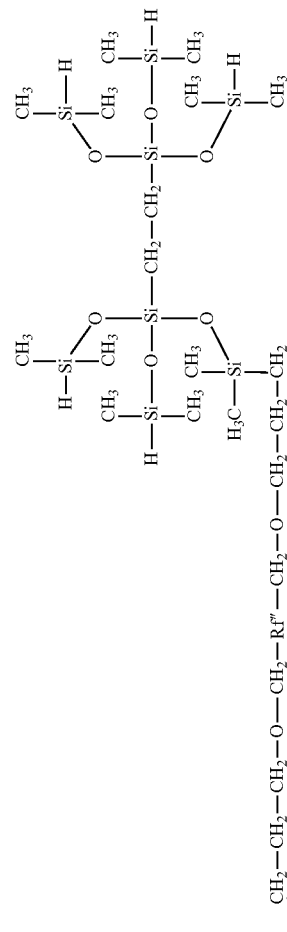
[Chem. 36]
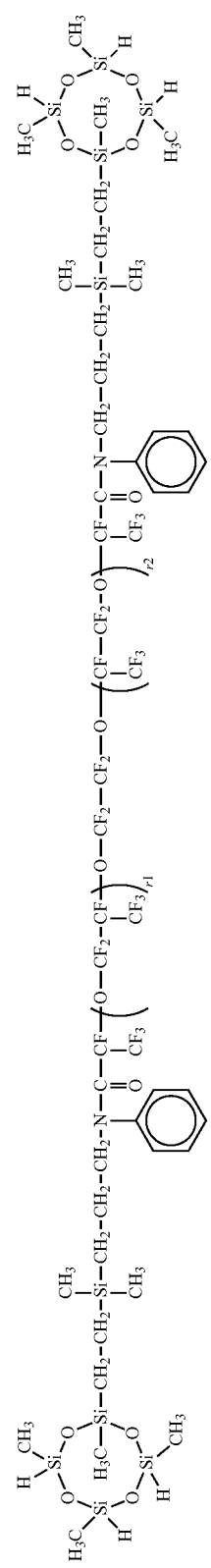

-continued
[Chem. 37]
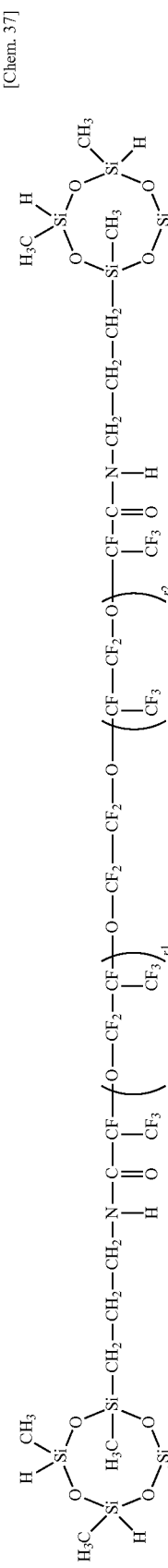
[Chem. 38]
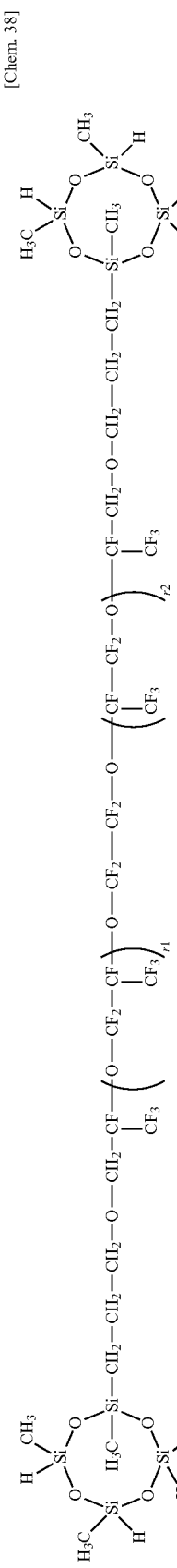
[Chem. 39]
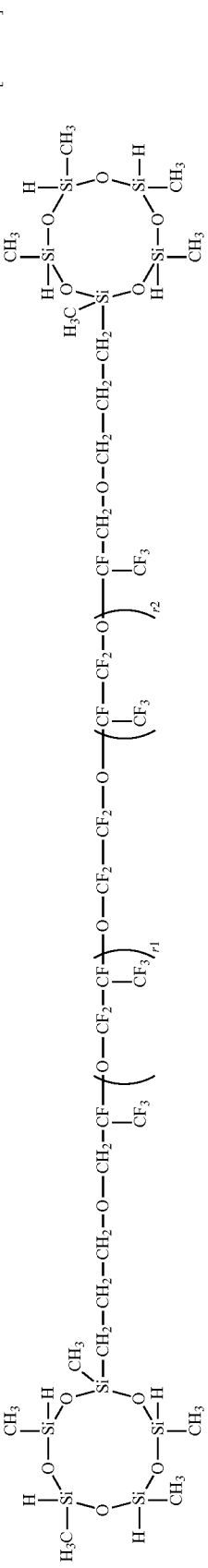
[Chem. 40]
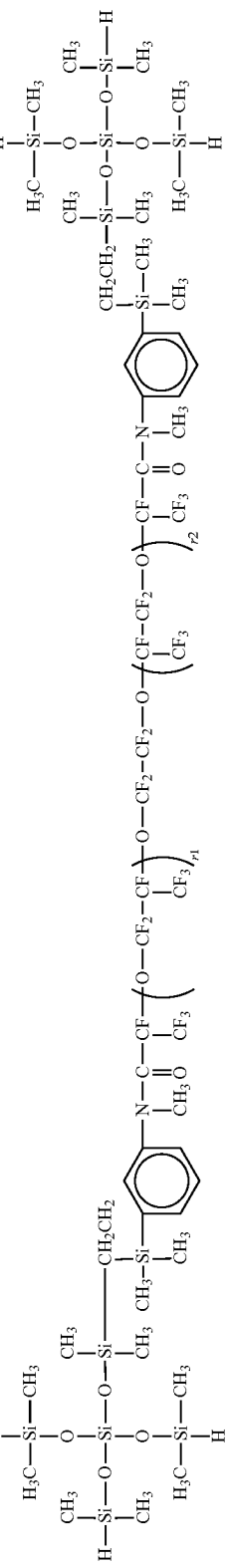

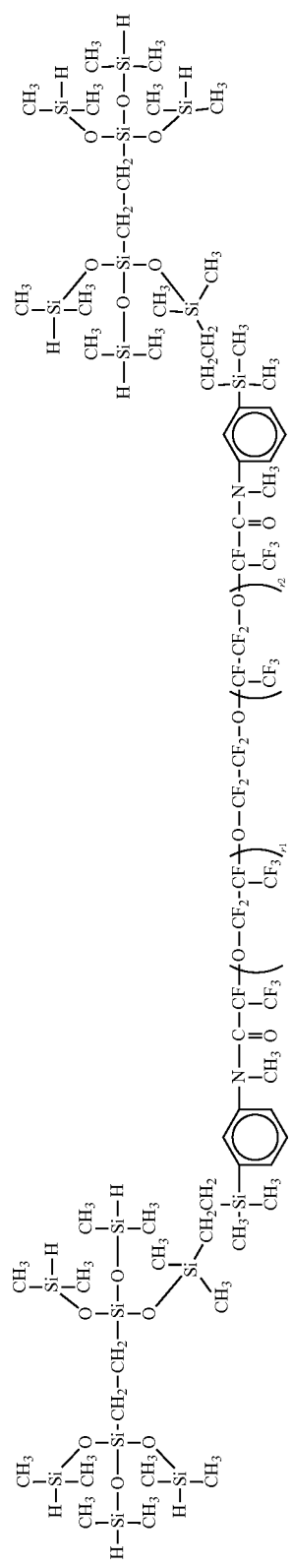
[Chem. 41]
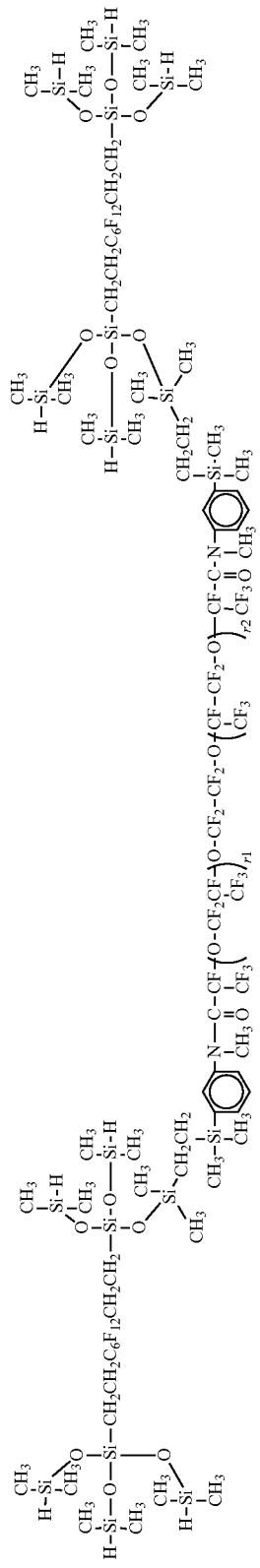
[Chem. 42]

(wherein Rf", r1, r2 and r1+r2 are the same as described above.)

Examples of $Z^3$ in the above formula (4) include those of the following formulae. In the following structure, it is preferable that the left dangling bond is bonded to a carbon atom and the right bond is bonded to a silicon atom.

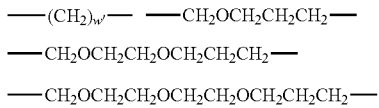

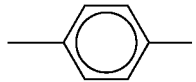

[Chem. 43]

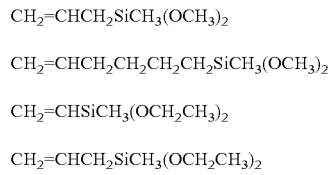

(wherein w' is an integer of 1 to 18.)

$Z^3$ is particularly preferably

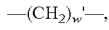

more preferably one in which w' is an integer of 1 to 10 in the above formula, particularly preferably one in which w' is an integer of 1 to 6 in the above formula.

Examples of the monovalent hydrocarbon group having 1 to 10 carbon atoms as $R^2$ in the above formula (4) include alkyl groups such as a methyl group, an ethyl group, a propyl group, an isopropyl group, a butyl group, an isobutyl group, a tert-butyl group, a pentyl group, a neopentyl group, a hexyl group and an octyl group; cycloalkyl groups such as a cyclohexyl group; alkenyl groups such as a vinyl group, an allyl group and a propenyl group; and aryl groups such as a phenyl group, and $R^2$ is particularly preferably a hydrogen atom.

Examples of the terminally unsaturated group-containing reactive silane compound of the above formula (4) include the following compounds.

$CH_2=CHSi(OCH_3)_3$ $CH_2=CHCH_2Si(OCH_3)_3$ $CH_2=CHCH_2CH_2Si(OCH_3)_3$ $CH_2=CHCH_2CH_2CH_2Si(OCH_3)_3$ $CH_2=CHCH_2CH_2CH_2CH_2Si(OCH_3)_3$ $CH_2=CHCH_2CH_2CH_2CH_2CH_2Si(OCH_3)_3$ $CH_2=CHSi(OC_2H_5)_3$ $CH_2=CHCH_2Si(OC_2H_5)_3$ $CH_2=CHCH_2CH_2Si(OC_2H_5)_3$ $CH_2=CHCH_2CH_2CH_2Si(OC_2H_5)_3$ $CH_2=CHCH_2CH_2CH_2CH_2Si(OC_2H_5)_3$ $CH_2=CHCH_2CH_2CH_2CH_2CH_2Si(OC_2H_5)_3$ $CH_2=CHSi(OC_3H_7)_3$ $CH_2=CHCH_2Si(OC_3H_7)_3$ $CH_2=CHCH_2CH_2Si(OC_3H_7)_3$ $CH_2=CHCH_2CH_2CH_2Si(OC_3H_7)_3$ $CH_2=CHCH_2CH_2CH_2CH_2CH_2Si(OC_3H_7)_3$ $CH_2=CHSiCH_3(OCH_3)_2$ $CH_2=CHCH_2SiCH_3(OCH_3)_2$ $CH_2=CHCH_2CH_2CH_2SiCH_3(OCH_3)_2$ $CH_2=CHSiCH_3(OCH_2CH_3)_2$ $CH_2=CHCH_2SiCH_3(OCH_2CH_3)_2$ $CH_2=CHCH_2CH_2SiCH_3(OCH_2CH_3)_2$ $CH_2=CHCH_2CH_2CH_2SiCH_3(OCH_2CH_3)_2$

Among these compounds, the following compounds are particularly preferable.

$CH_2=CHSi(OCH_3)_3$ $CH_2=CHCH_2Si(OCH_3)_3$ $CH_2=CHCH_2CH_2Si(OCH_3)_3$ $CH_2=CHCH_2CH_2CH_2Si(OCH_3)_3$ $CH_2=CHCH_2CH_2CH_2CH_2Si(OCH_3)_3$ $CH_2=CHCH_2CH_2CH_2CH_2CH_2Si(OCH_3)_3$ $CH_2=CHSi(OC_2H5)_3$ $CH_2=CHCH_2Si(OC_2H5)_3$

It is desirable to carry out the hydrosilylation (addition) reaction such that a perfluoropolyether compound of formula (3) which has a polyfunctional Si—H group is mixed with a terminally unsaturated group-containing reactive silane compound of formula (4), and the mixture is reacted in the presence of a platinum group metal-based addition reaction catalyst at a reaction temperature of 50 to 150° C., preferably 60 to 120° C., for 1 minute to 48 hours, particularly 10 minutes to 12 hours. If the reaction temperature is excessively low, the reaction may be stopped without sufficiently proceeding, and if the reaction temperature is excessively high, reaction heat from hydrosilylation may increase the temperature to the extent that it is impossible to control the reaction, leading to occurrence of bumping or decomposition of raw materials.

Here, it is desirable to set the reaction ratio between a perfluoropolyether compound of formula (3) which has a polyfunctional Si—H group and a terminally unsaturated group-containing reactive silane compound of formula (4) such that the number of moles of terminally unsaturated groups of the terminally unsaturated group-containing reactive silane compound of formula (4) is 0.9 to 5 times, particularly 1 to 2 times the total number of moles of H in the square bracket in the perfluoropolyether compound of formula (3) which has a polyfunctional Si—H group. If the amount of the terminally unsaturated group-containing reactive silane compound of formula (4) is excessively smaller, it may be difficult to obtain a target product. If the amount of the terminally unsaturated group-containing reactive silane compound of formula (4) is excessively larger, the homogeneity of the reaction solution may be deteriorated to the extent that the reaction rate becomes unstable, or it is necessary that conditions of heating, pressure reduction, extraction and the like for removal of an unreacted terminally unsaturated group-containing reactive silane compound of formula (4) after the reaction be tightened as the amount of the terminally unsaturated group-containing reactive silane compound of formula (4) increases.

As the addition reaction catalyst, for example, compounds containing a platinum group metal such as platinum, rhodium or palladium can be used. Among these compounds, compounds containing platinum are preferable, and hexachloroplatinic (IV) acid hexahydrate, a platinum carbonyl vinyl methyl complex, a platinum-divinyltetramethyldisiloxane complex, a platinum-cyclovinylmethylsiloxane complex, a platinum-octylaldehyde/octanol complex, or platinum supported on activated carbon can be used.

The compounding amount of the addition reaction catalyst is an amount such that the amount of the contained metal is preferably 0.1 to 5,000 ppm by weight, more preferably 0.2 to 1,000 ppm by weight, with respect to the perfluoropolyether compound of formula (3) which has a polyfunctional Si—H group.

The above-described addition reaction can be carried out without the presence of a solvent, and may be diluted with a solvent if necessary. Here, as the diluent solvent, an organic solvent that is widely and generally used, such as toluene, xylene or isooctane, can be used, and a solvent is preferable which has a boiling point higher than the intended reaction temperature and does not inhibit the reaction and in which the compounds of formulae (3) and (4) used in the reaction are soluble at the reaction temperature. As such a solvent, for example, a partially fluorine-modified solvent such as a fluorine-modified aromatic hydrocarbon-based solvent such as m-xylene hexafluoride or benzotrifluoride, or a fluorine-modified ether-based solvent such as methyl perfluorobutyl ether is desirable, and m-xylene hexafluoride is particularly preferable.

When a solvent is used, the amount of the solvent used is preferably 5 to 2,000 parts by weight, more preferably 50 to 500 parts by weight per 100 parts by weight of the perfluoropolyether compound of formula (3) which has a polyfunctional Si—H group. If the amount of the solvent is less than the above-mentioned amount, the effect of dilution with the solvent may decrease, and if the amount of the solvent is more than the above-mentioned amount, the dilution degree may become excessively high, leading to a decrease in reaction rate.

It is preferable to remove the unreacted compound of formula (4) and the diluent solvent by a known method such as distillation under reduced pressure, extraction, adsorption or the like after completion of the reaction. In particular, when a fluorine-containing solvent having a boiling point of 260° C. or lower at normal pressure, such as m-xylene hexafluoride, benzotrifluoride, perfluorobenzene, 1,1,1,3,3-pentafluorobutane, hydrofluoroether, it is preferable to remove the solvent so that the amount of the fluorine-containing solvent is less than 1 wt % with respect to the entire resulting coating agent composition containing the component (A). Here, the content of the fluorine-containing solvent having a boiling point of 260° C. or lower at normal pressure can be measured by, for example, performing calculation from the result of NMR measurement of an internal standard substance added to the coating agent composition containing the component (A) as necessary, on the basis of a $^{19}$F-NMR spectrum or a $^1$H-NMR spectrum of each solvent used in the reaction.

The unreacted compound of formula (4) and the volatile solvent free of fluorine atom can also be used as constituent elements of the coating agent composition of the present invention.

In addition, as another synthesis route for the component (A) in the present invention, the component (A) can be obtained by reacting a perfluoropolyether compound of the following general formula (5), which has a terminally unsaturated group, with a reactive silane compound of the following general formula (6) which has one Si—H group and at least one hydrolyzable silyl group, as another form of the embodiment of the present invention.

  (5)

  (6)

(wherein Rf, $Q^1$, $Z^2$, R, M, a, b, c and b+c are as described above, each $Z^4$ is independently a monovalent hydrocarbon group having one carbon-carbon unsaturated bond capable of addition reaction with a Si—H group at the terminal, having 2 to 20 carbon atoms and optionally containing one or more selected from an oxygen atom, a nitrogen atom a fluorine atom and a silicon atom, and optionally contains an intermediate cyclic structure and/or an unsaturated bond; and Hs and "a" number of $Z^2$ in formula (6) are all bonded to the silicon atom in the $Q^1$ structure.)

Here, specific examples of $Z^4$ in the general formula (5) include the following structures.

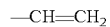

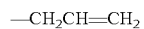

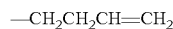

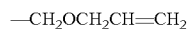

[Chem. 44]

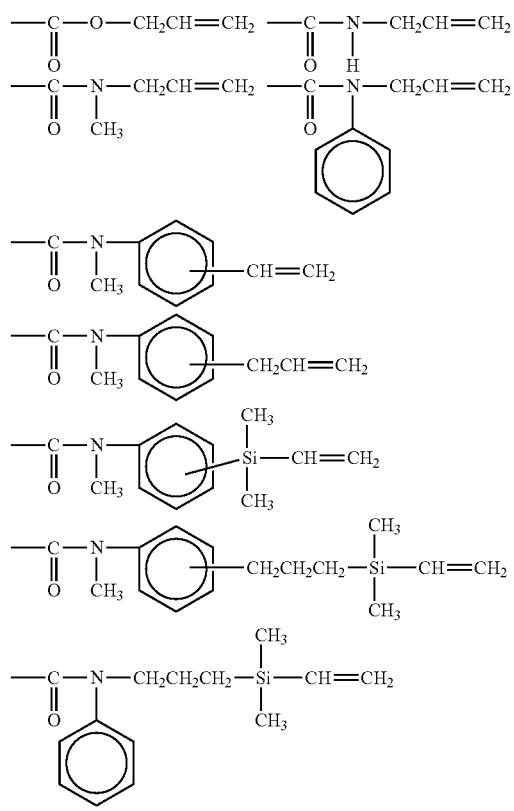

Here, as the perfluoropolyether compound of the above formula (5) which has a terminally unsaturated group, those shown below can be exemplified.

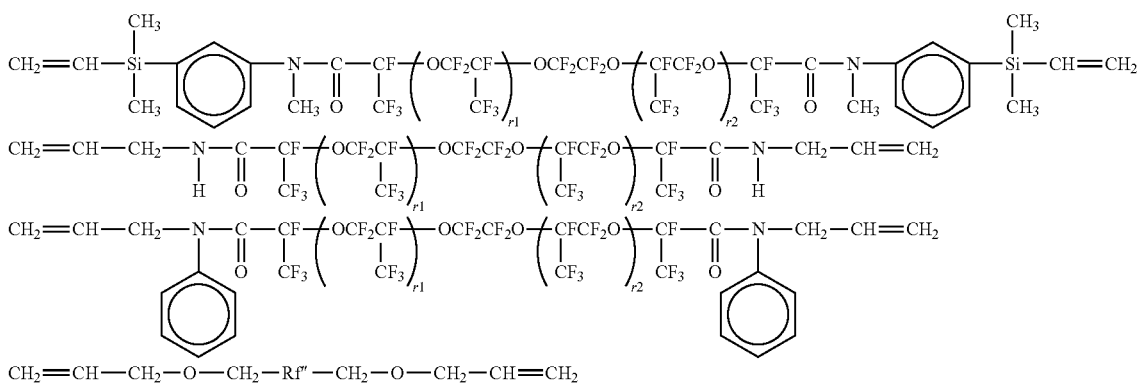

[Chem. 45]

(wherein Rf'', r1, r2 and r1+r2 are as described above.)

As the reactive silane compound of the above formula (6) which has one Si—H group and at least one hydrolyzable silyl group, those shown below can be exemplified.

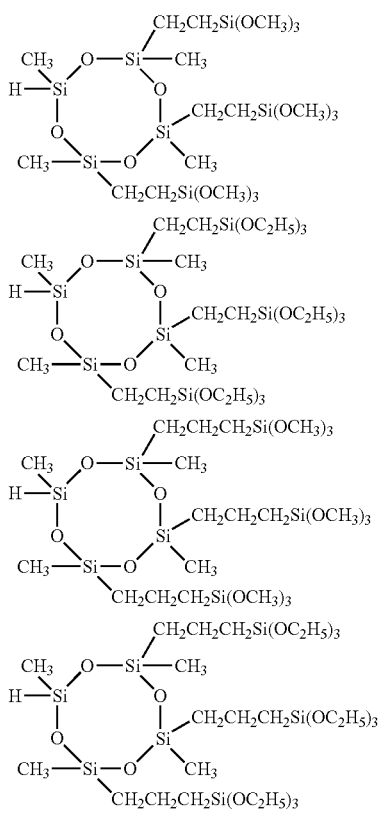

[Chem. 46]

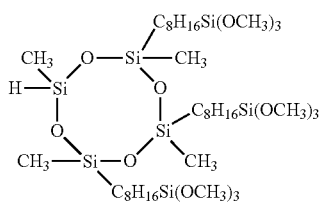

[Chem.47]

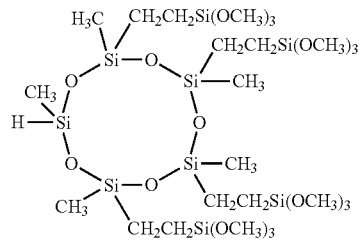

[Chem. 48]

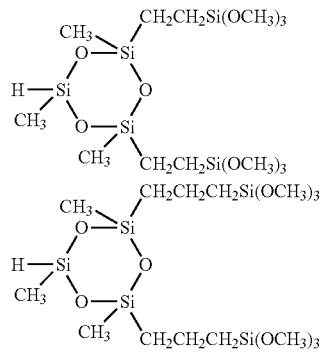

[Chem.49]

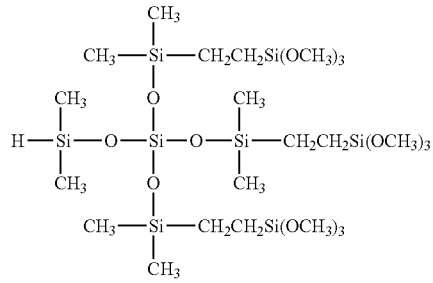

[Chem. 50]

It is desirable that the reaction between a perfluoropolyether compound of formula (5) which has a terminally unsaturated group and a reactive silane compound of formula (6) be carried out by mixing these compounds and reacting the mixture in the presence of a platinum group metal-based addition reaction catalyst at a reaction temperature of 50 to 150° C., preferably 60 to 120° C., for 1 minute to 48 hours, particularly 10 minutes to 12 hours. If the reaction temperature is excessively low, the reaction may be stopped without sufficiently proceeding, and if the reaction temperature is excessively high, reaction heat from hydrosilylation may increase the temperature to the extent that it is impossible to control the reaction, leading to occurrence of bumping or decomposition of raw materials.

Here, it is desirable to set the reaction ratio between a perfluoropolyether compound of formula (5) which has a terminally unsaturated group and a reactive silane compound of formula (6) such that the number of moles of H in formula (6) is 0.9 to 2 times, particularly 1 to 1.05 times the total number of moles of terminally unsaturated groups in formula (5). It is desirable that all H in Formula (6) react.

As the addition reaction catalyst, for example, compounds containing a platinum group metal such as platinum, rhodium or palladium can be used. Among these compounds, compounds containing platinum are preferable, and hexachloroplatinic (IV) acid hexahydrate, a platinum carbonyl vinyl methyl complex, a platinum-divinyltetramethyldisiloxane complex, a platinum-cyclovinylmethylsiloxane complex, a platinum-octylaldehyde/octanol complex, or platinum supported on activated carbon can be used.

The compounding amount of the addition reaction catalyst is such that the amount of the contained metal is preferably 0.1 to 5,000 ppm by weight, more preferably 1 to 1,000 ppm by weight, with respect to the perfluoropolyether compound of formula (5) which has a terminally unsaturated group.

The above-described addition reaction can be carried out without the presence of a solvent, and may be diluted with a solvent if necessary. Here, as the diluent solvent, an organic solvent that is widely and generally used, such as toluene, xylene or isooctane, can be used, and a solvent is preferable which has a boiling point higher than the intended reaction temperature and does not inhibit the reaction and in which a perfluoropolyether of formula (1) generated after the reaction is soluble at the reaction temperature. As such a solvent, for example, a partially fluorine-modified solvent such as a fluorine-modified aromatic hydrocarbon-based solvent such as m-xylene hexafluoride or benzotrifluoride, or a fluorine-modified ether-based solvent such as methyl perfluorobutyl ether is desirable, and m-xylene hexafluoride is particularly preferable.

When a solvent is used, the amount of the solvent used is preferably 5 to 2,000 parts by weight, more preferably 50 to 500 parts by weight per 100 parts by weight of the perfluoropolyether compound of formula (5) which has a terminally unsaturated group. If the amount of the solvent is less than the above-mentioned amount, the effect of dilution with the solvent may decrease, and if the amount of the solvent is more than the above-mentioned amount, the dilution degree may become excessively high, leading to a decrease in reaction rate.

It is preferable to remove the unreacted reactive silane compound of formula (6) and the diluent solvent by a known method such as distillation under reduced pressure, extraction, adsorption or the like after completion of the reaction. In particular, when the above-described fluorine-containing solvent having a boiling point of 260° C. or lower at normal pressure is contained, it is necessary to remove the solvent so that the amount of the fluorine-containing solvent is less than 1 wt % with respect to the entire resulting coating agent composition containing the component (A). The unreacted reactive silane compound of formula (6) and the volatile solvent free of fluorine atom can also be used as constituent elements of the coating agent composition of the present invention.

[Component (B)]

The perfluoropolyether compound (B) in the present invention has the following general formula (2).

$$F\text{—}Rf'\text{—}F \quad (2)$$

Here, in the above formula (2), Rf' is a divalent perfluoropolyether group having a numerical average molecular weight of 1,500 to 20,000, and as long as the numerical average molecular weight falls within this range, compounds having a larger or smaller molecular weight may be contained.

Rf' can have the same structure as that shown for Rf, and may be identical to or different from Rf in structure, numerical average molecular weight and molecular weight distribution.

Examples of the perfluoropolyether compound (B) include those shown below.

$$CF_3O(CF_2O)_p(CF_2CF_2O)_qCF_3$$

$$CF_3CF_2O(CF_2O)_t(CF_2CF_2O)_qCF_2CF_3$$

$$CF_3CF_2[OCF_2CF(CF_3)]_sO(C_uF_{2n}O)_v[CF(CF_3)CF_2O]_t CF_2CF_3$$

$$CF_3CF_2CF_2O[CF(CF_3)CF_2O]_tCF_2CF_3$$

(wherein p, q, p+q, s, t, s+t, u and v are as described above, and the sequence of each repeating unit of —$CF_2O$— and —$CF_2CF_2O$— is random.)

The perfluoropolyether compound (B) in the present invention can be contained in an amount such that the content ratio of the perfluoropolyether compound (B) is less than 2.5 mol %, preferably 1.5 mol % or less, more preferably 1 mol % or less per a total of 100 mol % of the perfluoropolyether compound (A) and the perfluoropolyether compound (B). When the content ratio of the perfluoropolyether compound (B) is above the range described above, solubility in the non-fluorine compound may decrease to the extent that a uniform coating film cannot be obtained when the composition is applied and cured as a final curable composition. Here, the content ratio of the perfluoropolyether compound (B) is preferably less than 1.5 parts by weight, more preferably 1 part by weight or less per a total of 100 mol % of the perfluoropolyether compound (A) and the perfluoropolyether compound (B).

When the component (A) contains the component (B) beforehand, the content of the component (B) can be determined by isolating the component (A) and the component (B) by respective separation methods, and when the component (A) does not contain the component (B), the content of the component (B) can be determined by the compounding amounts of the components.

The perfluoropolyether compound (B) may be contained beforehand as a by-product or a process contaminant in the component (A) or the perfluoropolyether compound as a raw material of the component (A). Here, adjustment can be performed by any known separation method such as adsorption treatment, extraction or thin-film distillation so that the content of the component (B) with respect to the component (A) falls within the above-described range. Specifically, when there is a large difference in molecular weight between the component (A) and the component (B), separation by thin film distillation is suitable, and when separation by thin-film distillation is difficult, there is column chromatography using a filling agent such as silica gel whose adsorptivity varies due to a difference in terminal group between the component (A) and component (B) with the component (A) dissolved in a poor solvent, or a method in which separation is performed using an extraction solvent by making use of a difference in solubility due to a difference in terminal group. In particular, adjustment can be performed by separating the components by chromatography using a supercritical solvent as a mobile phase.

On the other hand, the component (B) may be intentionally blended with the component (A) within the bounds of improving properties such as an oil-repellent property, a surface floating property. Here, the amount of the perfluoropolyether compound (B) is preferably 0.1 mol % or more per a total of 100 mol % of the perfluoropolyether compound (A) and the perfluoropolyether compound (B), and preferably 0.1 parts by weight or more per a total of 100 parts by weight of the perfluoropolyether compound (A) and the perfluoropolyether compound (B).

[Coating Agent Composition]

The coating agent composition of the present invention contains the perfluoropolyether compound (A), the content ratio of the perfluoropolyether compound (B) is less than 2.5 mol %, preferably 1.5 mol % or less, more preferably 1 mol % or less, per a total of 100 mol % of the component (A) and the component (B), and the content of the fluorine-containing solvent having a boiling point of 260° C. or lower at normal pressure (1 atm) is less than 1 wt % with respect to the entire composition. The coating agent composition of the present invention may be used as a solvent-free composition, or may contain a volatile organic solvent (C) free of a fluorine atom.

As such a volatile organic solvent (C) free of a fluorine atom, any solvent can be used, and a compound containing only hydrogen atoms and carbon atoms or a compound containing only hydrogen atoms, carbon atoms and oxygen atoms is preferable. Specific examples thereof include hydrocarbon-based organic solvents, ketone-based organic solvents, ether-based organic solvents, ester-based organic solvents, and alcohol-based organic solvents. These solvents may be used alone or used in combination of two or more thereof.

Specific examples of the hydrocarbon-based organic solvent include pentane, hexane, heptane, isododecane, isooctane and cyclohexane.

Specific examples of the ketone-based organic solvent include acetone, methyl ethyl ketone, methyl isobutyl ketone and cyclohexanone.

Specific examples of the ether-based organic solvent include diethyl ether, diisopropyl ether, dibutyl ether, tetrahydrofiran, polyethylene glycol monomethyl ether and tetraethylene glycol dimethyl ether.

Specific examples of the ester-based organic solvent include ethyl acetate, propyl acetate and butyl acetate.

Specific examples of the alcohol-based organic solvent include methanol, ethanol, isopropanol and n-butanol.

Among these volatile organic solvents free of a fluorine atom, hydrocarbon-based organic solvents are preferable because the perfluoropolyether compound for use in the present invention has further excellent solubility in these solvents.

It is desirable that the boiling point of the volatile organic solvent free of a fluorine atom be 0 to 260° C., preferably 30 to 200° C., more preferably 60 to 150° C. at normal pressure.

The use amount of the volatile organic solvent free of a fluorine atom is not particularly limited, the volatile organic solvent may be diluted at any ratio according to the application, and it is desirable that for example, 25 to 1,999,900 parts by weight of the volatile organic solvent be contained per 100 parts by weight of the component (A).

In the present invention, a coating agent composition containing the component (A) and having a controlled content of the component (B) as described above is provided, and consequently, it is possible to obtain a surface treatment agent which can be diluted with at least one volatile organic solvent (C) free of a fluorine atom without using a fluoro-volatile component (fluorine-containing solvent having a boiling point of 260° C. or lower at normal pressure), and imparts properties obtained from the perfluoropolyether compound as the component (A) to a surface.

Even a perfluoropolyether compound (e.g. one having formula (1)) which is soluble in an organic solvent free of a fluorine atom (hereinafter, also referred to as a non-fluorine solvent) when used alone has been heretofore dissolved with a fluorine-containing solvent because the solubility of such a compound in a non-fluorine solvent is decreased by the presence of a nonfunctional perfluoropolyether compound inevitably mixed in the process of synthesizing the compound (e.g. one having formula (2)). The present inventors have conducted studies on improvement of the solubility of the above-described mixture in a non-fluorine solvent for meeting recent restraint in the use of a fluorine-containing solvent, and resultantly found that although it has been heretofore considered that complete removal of the nonfunctional perfluoropolyether compound is necessary, complete removal of such a compound is not necessary, and by suppressing the content thereof to a certain low level, even the above-described mixture can be dissolved in a non-fluorine solvent In this way, the present invention has been completed.

The coating agent composition of the present invention can be a surface treatment agent which is applied to a substrate by a known method such as a dry coating method or a wet coating method, specifically, brush coating, dipping, spraying or vapor deposition treatment. In addition, the curing temperature varies depending on the curing method, and for example, the desirable curing temperature is from room temperature (20° C. ±15° C.) to 200° C. in the case of application by a spray method, an inkjet method, a dipping method, a brush coating or a vacuum vapor deposition method, particularly room temperature (20° C. ±15° C.) in the case of a vacuum vapor deposition method, and in the range of 50 to 150° C. in the case of other methods. As the curing humidity, it is desirable to perform curing under a humidified condition for accelerating the reaction. The thickness of the cured film is appropriately selected depending on the type of a substrate, and is typically 0.1 to 100 nm, particularly 3 to 30 nm.

If the film has poor adhesion, adhesion can be improved by providing a $SiO_2$ layer as a primer layer, or performing vacuum plasma treatment, atmospheric pressure plasma treatment or alkali treatment.

The coating agent composition of the present invention has a water/oil-repellent property, and the water contact angle of the cured film is 100° or more, particularly 101° or more. If the water contact angle is less than 100°, the water-repellent property as a coating film is insufficient, and it cannot be said that the coating film is excellent in water/oil-repellent property.

The substrate treated with the coating agent composition of the present invention is not particularly limited, and may be one made of any of various materials such as paper, cloth, metals and oxides thereof, glass, plastic, ceramic and quartz. The coating agent composition of the present invention can impart a water/oil-repellent property, chemical resistance, mold releasability, a low-dynamic friction property and an anti-fouling property to these substrates. In particular, excellent anti-fouling performance can be imparted without impairing the transparency and texture of various articles, the substrate can be protected from ingress of chemicals and the like, and the anti-fouling performance can be maintained for a long period of time. Examples of the article to be treated with the coating agent composition of the present invention include optical articles, films, glass, quartz boards and antireflection films. Particularly, the coating agent composition is used for touch panels, articles treated for antireflection, glass, tempered glass, sapphire glass, quartz glass and $SiO_2$-treated substrates.

EXAMPLES

Synthesis Example, Examples and Comparative Examples are given below to more concretely illustrate the present invention, although the present invention is not limited by these Examples.

[Synthesis Example 1-1]

In a 200 mL four-necked flask equipped with a reflux apparatus and a stirrer in a dry air atmosphere, 50.0 g (Si—H group: 0.067 mol) of a mixture (I) containing a compound of the following formula:

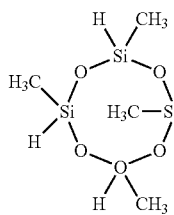 —CH₂—CH₂—CH₂—O—CH₂—Rf¹—CH₂—O—CH₂—CH₂—CH₂— 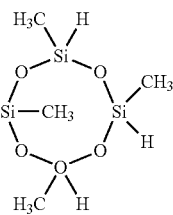

[Chem. 51]

($Rf^1$: —$CF_2O(CF_2O)_{20.7}(CF_2CF_2O)_{22.3}CF_2$—, provided that the number of the repeating units is an average value determined by $^{19}F$-NMR, and the same applies to the following Examples.)

and a very small amount (0.36 g) of a nonfunctional polymer (B1) of the following formula:

F—$Rf^1$—F, 10.3 g (0.070 mol) of $CH_2$=$CHSi(OCH_3)_3$, 50.0 g of m-xylene hexafluoride (boiling point: 116° C.), and 0.0884 g of a toluene solution of chloroplatinic acid/vinylsiloxane complex (containing 2.2×10⁻⁷ mol of the complex in terms of Pt alone) were mixed, and the mixture was stirred at 100° C. for 4 hours. Disappearance of a peak derived from a Si—H group was confirmed by $^1H$-NMR and IR, the reaction solution was cooled to room temperature. Subsequently, distillation was performed under reduced pressure for 2 hours under the condition of 100° C./267 Pa with an evaporator to remove m-xylene hexafluoride and unreacted $CH_2$=$CHSi(OCH_3)_3$, thereby obtaining 58.2 g of a mixture (II-1) containing a compound (A1) of the following formula and a nonfunctional polymer (B1). The result of $^{19}F$-NMR showed that the amount of the nonfunctional polymer was 0.98 mol % (0.72 wt %) as calculated from (number of moles of nonfunctional polymer)/(number of moles of compound (II-1)+number of moles of nonfunctional polymer)×100=(b/6)/((a/2)+(h/6))×100 (%), where a is an integral value of peaks in $CF_2O(CF_2O)_{20.7}(CF_2CF_2O)_{22.3}CF_2$—$CH_2$—, and b is a peak integral value in F—$Rf^1$—F. In addition, the residual amount of m-xylene hexafluoride was 0.003 wt % as determined from a peak integral value of $CF_3$ groups of m-xylene hexafluoride in a $^{19}F$-NMR spectrum with hexafluorobenzene as a standard substance.

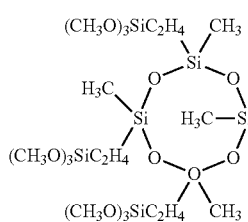 —CH₂—CH₂—CH₂—O—CH₂—Rf¹—CH₂—O—CH₂—CH₂—CH₂— 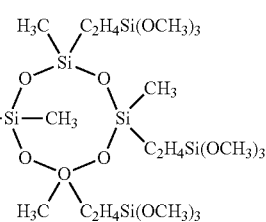

[Chem. 52]

[Synthesis Example 1-2]

A compound (B-1) of the following formula was added to the mixture (II-1) from Synthesis Example 1-1 to obtain 10.3 g of a mixture (II-2) containing a total of 1.93 mol % of the component corresponding to (B).

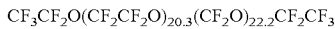

[Synthesis Example 1-3]

A compound (B-1) of the above formula was added to the mixture (II-1) from Synthesis Example 1-1 to obtain 10.2 g of a mixture (II-3) containing a total of 2.76 mol % of the component corresponding to (B).

[Synthesis Example 2-1]

In a 200 mL four-necked flask equipped with a reflux apparatus and a stirrer in a dry air atmosphere, 50.0 g (Si—H group: 0.067 mol) of a mixture (I) containing a very small amount of the nonfunctional polymer (B1), 11.4 g (0.070 mol) of $CH_2$=$CHCH_2Si(OCH_3)_3$, 50.0 g of m-xylene hexafluoride, and 0.0884 g of a toluene solution of chloroplatinic acid/vinylsiloxane complex (containing 2.2x10- mol of the complex in terms of Pt alone) were mixed, and the mixture was stirred at 100° C. for 4 hours. Disappearance of a peak derived from a Si—H group was confirmed by $^1$H-NMR and IR, the reaction solution was cooled to room temperature. Subsequently, distillation was performed under reduced pressure for 2 hours under the condition of 100° C./267 Pa with an evaporator to remove m-xylene hexafluoride and unreacted $CH_2$=$CHCH_2Si(OCH_3)_3$, thereby obtaining 56.4 g of a mixture (III-1) containing a compound (A2) of the following formula and 0.89 mol % (0.65 wt %) of a nonfunctional polymer (B1). In addition, the residual amount of m-xylene hexafluoride was 0.004 wt %.

[Chem. 53]

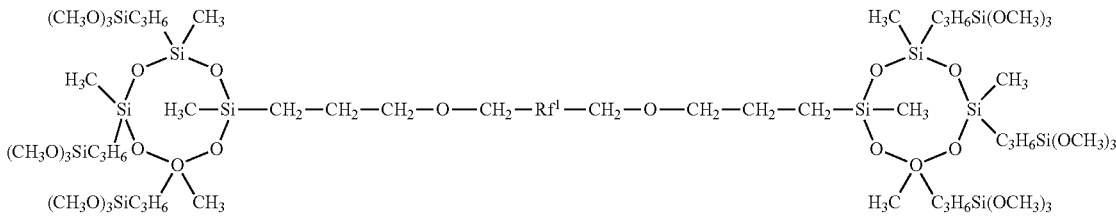

[Synthesis Example 2-2]

A compound (B-1) of the above formula was added to the mixture (III-1) from Synthesis Example 2-1 to obtain 10.4 g of a mixture (III-2) containing a total of 1.87 mol % of the component corresponding to (B).

[Synthesis Example 2-3]

A compound (B-1) of the above formula was added to the mixture (III-1) from Synthesis Example 2-1 to obtain 10.3 g of a mixture (III-3) containing a total of 2.78 mol % of the component corresponding to (B).

[Synthesis Example 3-1]

In a 200 mL four-necked flask equipped with a reflux apparatus and a stirrer in a dry air atmosphere, 50.0 g (Si—H group: 0.067 mol) of a mixture (I) containing a very small amount of the nonfunctional polymer (B1), 16.3 g (0.070 mol) of $CH_2$=$CH(CH_2)_6Si(OCH_3)_3$, 50.0 g of m-xylene hexafluoride, and 0.0884 g of a toluene solution of chloroplatinic acid/vinylsiloxane complex (containing 2.2x10$^{-7}$ mol of the complex in terms of Pt alone) were mixed, and the mixture was stirred at 100° C. for 4 hours. Disappearance of a peak derived from a Si—H group was confirmed by $^1$H-NMR and IR, the reaction solution was cooled to room temperature. Subsequently, distillation was performed under reduced pressure for 2 hours under the condition of 100° C./267 Pa with an evaporator to remove m-xylene hexafluoride and unreacted $CH_2$=$CH(CH_2)_6Si(OCH_3)_3$, thereby obtaining 57.7 g of a mixture (IV-1) containing a compound (A3) of the following formula and 1.24 mol % (0.84 wt %) of a nonfunctional polymer (B1). In addition, the residual amount of m-xylene hexafluoride was 0.002 wt %.

[Chem. 54]

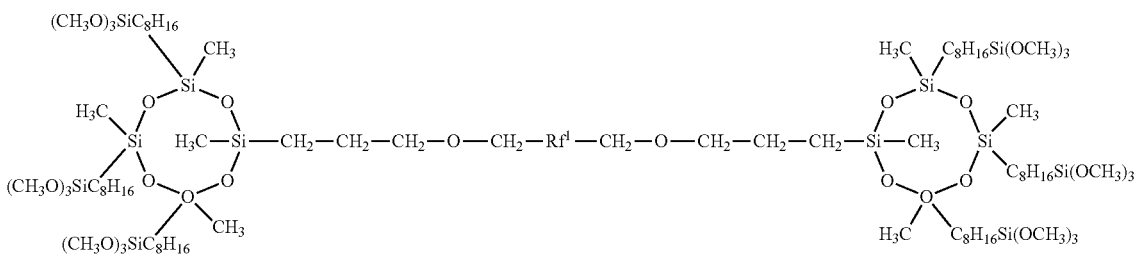

[Synthesis Example 3-2]

A compound (B-1) of the above formula was added to the mixture (IV-1) from Synthesis Example 3-1 to obtain 10.1 g of a mixture (IV-2) containing a total of 1.68 mol % of the component corresponding to (B).

[Synthesis Example 3-3]

A compound (B-1) of the above formula was added to the mixture (IV-1) from Synthesis Example 3-1 to obtain 10.2 g of a mixture (IV-3) containing a total of 3.31 mol % of the component corresponding to (B).

[Synthesis Example 4-1]

In a 200 mL four-necked flask equipped with a reflux apparatus and a stirrer in a dry air atmosphere, 50.0 g (Si—H group: 0.119 mol) of a mixture (V) containing a compound of the following formula:

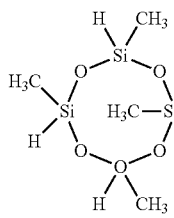

$(Rf^2: —CF_2O(CF_2O)_{11.2}(CF_2CF_2O)_{12.1}CF_2—)$, and a very small amount (0.38 g) of a nonfunctional polymer (B2) of the following formula:

F—$Rf^2$—F, 18.2 g (0.124 mol) of $CH_2$=$CHSi(OCH_3)_3$, 50.0 g of m-xylene hexafluoride, and 0.157 g of a toluene solution of chloroplatinic acid/vinylsiloxane complex (containing 3.9x $10^{-7}$ mol of the complex in terms of Pt alone) were mixed, and the mixture was stirred at 100° C. for 4 hours. Disappearance of a peak derived from a Si—H group was confirmed by $^1$H-NMR and IR, the reaction solution was cooled to room temperature. Subsequently, distillation was performed under reduced pressure for 2 hours under the condition of 100° C./267 Pa with an evaporator to remove m-xylene hexafluoride and unreacted $CH_2$=$CHSi(OCH_3)_3$, thereby obtaining 74.5 g of a mixture (VI-1) containing a compound (A4) of the following formula and 1.23 mol % (0.75 wt %) of the nonfunctional polymer (B2). In addition, the residual amount of m-xylene hexafluoride was 0.001 wt %.

[Synthesis Example 4-2]

A compound (B-2) of the following formula was added to the mixture (VI-1) from Synthesis Example 4-1 to obtain 10.1 g of a mixture (VI-2) containing a total of 2.14 mol % of the component corresponding to (B).

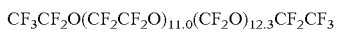

$CF_3CF_2O(CF_2CF_2O)_{11.0}(CF_2O)_{12.3}CF_2CF_3$

[Synthesis Example 4-3]

A compound (B-2) of the above formula was added to the mixture (VI-1) from Synthesis Example 4-1 to obtain 10.4 g of a mixture (VI-3) containing a total of 3.63 mol % of the component corresponding to (B).

Solubility in Dilution Solvent

Example 1-1

The mixture (II-1) prepared in Synthesis Example 1-1 was diluted to a solid content concentration of 10 wt % with methyl ethyl ketone (MEK) to prepare a surface treatment

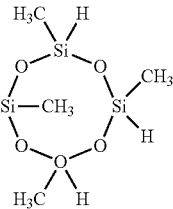

[Chem. 55]

agent (coating agent composition), and the solubility thereof was evaluated on the basis of the following evaluation criteria.

○: The result of visual observation shows that the solution is clear.

x: The result of visual observation shows that the solution is cloudy.

[Example 1-2]

Evaluation was performed in the same manner as in Example 1-1 except that the dilution solvent was changed to isopropanol (IPA).

[Example 1-3]

Evaluation was performed in the same manner as in Example 1-1 except that the mixture to be diluted was changed to the mixture (II-2) synthesize in Synthesis Example 1-2.

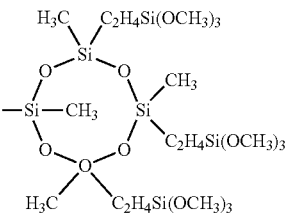

[Chem. 56]

[Comparative Example 1-4]

Evaluation was performed in the same manner as in Example 1-1 except that the mixture to be diluted was changed to the mixture (II-3) synthesize in Synthesis Example 1-3.

[Example 2-1]
Evaluation was performed in the same manner as in Example 1-1 except that the mixture to be diluted was changed to the mixture (III-1) synthesize in Synthesis Example 2-1.
[Example 2-2]
Evaluation was performed in the same manner as in Example 2-1 except that the dilution solvent was changed to isopropanol (IPA).
[Example 2-3]
Evaluation was performed in the same manner as in Example 1-1 except that the mixture to be diluted was changed to the mixture (III-2) synthesize in Synthesis Example 2-2.
[Comparative Example 2-4]
Evaluation was performed in the same manner as in Example 1-1 except that the mixture to be diluted was changed to the mixture (III-3) synthesize in Synthesis Example 2-3.
[Example 3-1]
Evaluation was performed in the same manner as in Example 1-1 except that the mixture to be diluted was changed to the mixture (IV-1) synthesize in Synthesis Example 3-1.
[Example 3-2]
Evaluation was performed in the same manner as in Example 3-1 except that the dilution solvent was changed to isopropanol (IPA).
[Example 3-3]
Evaluation was performed in the same manner as in Example 3-1 except that the dilution solvent was changed to n-butanol.
[Example 3-4]
Evaluation was performed in the same manner as in Example 3-1 except that the dilution solvent was changed to polyethylene glycol monomethyl ether (MPEG).
[Example 3-5]
Evaluation was performed in the same manner as in Example 3-1 except that the dilution solvent was changed to hexane.
[Example 3-6]
Evaluation was performed in the same manner as in Example 3-1 except that the dilution solvent was changed to heptane.
[Example 3-7]
Evaluation was performed in the same manner as in Example 3-1 except that the dilution solvent was changed to isododecane.
[Example 3-8]
Evaluation was performed in the same manner as in Example 1-1 except that the mixture to be diluted was changed to the mixture (IV-2) synthesize in Synthesis Example 3-2.
[Comparative Example 3-9]
Evaluation was performed in the same manner as in Example 1-1 except that the mixture to be diluted was changed to the mixture (IV-3) synthesize in Synthesis Example 3-3.
[Example 4-1]
Evaluation was performed in the same manner as in Example 1-1 except that the mixture to be diluted was changed to the mixture (VI-1) synthesize in Synthesis Example 4-1.
[Example 4-2]
Evaluation was performed in the same manner as in Example 4-1 except that the dilution solvent was changed to isopropanol (IPA).

Example 4-31

Evaluation was performed in the same manner as in Example 1-1 except that the mixture to be diluted was changed to the mixture (VI-2) synthesize in Synthesis Example 4-2.

Comparative Example 4-41

Evaluation was performed in the same manner as in Example 1-1 except that the mixture to be diluted was changed to the mixture (VI-3) synthesize in Synthesis Example 4-3.

Comparative Example 5-11

Evaluation was performed in the same manner as in Example 1-1 except that the mixture to be diluted was changed to a compound (VII) of the following formula, which had been synthesized and extracted in accordance with a method disclosed in JP-A 2012-233157.

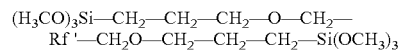

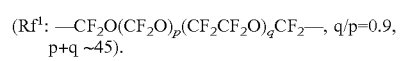
[Chem. 57]

Comparative Example 5-21

Evaluation was performed in the same manner as in Comparative Example 5-1 except that the dilution solvent was changed to isopropanol (IPA).

The evaluation results are shown in Tables 1 to 3.

TABLE 1

| | Mixture | Dilution solvent | Solubility |
|---|---|---|---|
| Example 1-1 | II-1 | MEK | ○ |
| Example 1-2 | II-1 | IPA | X |
| Example 2-1 | III-1 | MEK | ○ |
| Example 2-2 | III-1 | IPA | X |
| Example 3-1 | IV-1 | MEK | ○ |
| Example 3-2 | IV-1 | IPA | ○ |
| Example 4-1 | VI-1 | MEK | ○ |
| Example 4-2 | VI-1 | IPA | ○ |
| Comparative Example 5-1 | VII | MEK | X |
| Comparative Example 5-2 | VII | IPA | X |

TABLE 2

| | Mixture | Dilution solvent | Solubility |
|---|---|---|---|
| Example 3-3 | IV-1 | n-Butanol | ○ |
| Example 3-4 | IV-1 | MPEG | ○ |
| Example 3-5 | IV-1 | Hexane | ○ |
| Example 3-6 | IV-1 | Heptane | ○ |
| Example 3-7 | IV-1 | Isododecane | ○ |

TABLE 3

| | Mixture | Component (A) (mol %/wt %) | (B) Nonfunctional polymer (mol %/wt %) | (C) Dilution solvent | Solubility |
|---|---|---|---|---|---|
| Example 1-1 | II-1 | 99.02/99.28 | 0.98/0.72 | MEK | ○ |
| Example 1-3 | II-2 | 98.07/98.58 | 1.93/1.42 | MEK | ○ |

TABLE 3-continued

| | Mixture | Component (A) (mol %/wt %) | (B) Nonfunctional polymer (mol %/wt %) | (C) Dilution solvent | Solubility |
|---|---|---|---|---|---|
| Comparative Example 1-4 | II-3 | 97.24/97.97 | 2.76/2.03 | MEK | X |
| Example 2-1 | III-1 | 99.11/99.35 | 0.89/0.65 | MEK | ○ |
| Example 2-3 | III-2 | 98.13/98.64 | 1.87/1.36 | MEK | ○ |
| Comparative Example 2-4 | III-3 | 97.22/97.98 | 2.78/2.02 | MEK | X |
| Example 3-1 | IV-1 | 98.76/99.16 | 1.24/0.84 | MEK | ○ |
| Example 3-8 | IV-2 | 98.32/98.86 | 1.68/1.14 | MEK | ○ |
| Comparative Example 3-9 | IV-3 | 96.69/97.75 | 3.31/2.25 | MEK | X |
| Example 4-1 | VI-1 | 98.77/99.25 | 1.23/0.75 | MEK | ○ |
| Example 4-3 | VI-2 | 97.86/98.68 | 2.14/1.32 | MEK | ○ |
| Comparative Example 4-4 | VI-3 | 96.37/97.73 | 3.63/2.27 | MEK | X |

Formation of Cured Film by Dip Coating

Example 3-101

A surface of chemically strengthened glass (Gorilla II manufactured by Coming Incorporated) subjected to plasma treatment cleaning under the following conditions was dip-coated with the surface treatment agent prepared in Example 3-5, and the surface treatment agent was cured at 120° C. for 30 minutes to form a cured film (film thickness: about 10 nm), thereby obtaining a test specimen.
[Conditions for Plasma Treatment]
  Apparatus: Plasma Dry Cleaning Apparatus PDC 210
  Gas: 02 gas 80 cc and Ar gas 10 cc
  Output: 250 W
  Time: 30 sec Example 3-111

A test specimen was obtained by forming a cured film (film thickness: about 10 nm) in the same manner as in Example 3-10 except that the surface treatment agent was changed to that prepared in Example 3-6.

Formation of Cured Film by Spray Coating

Example 3-121

Using a spray coating apparatus (NST-51 manufactured by T & K Inc.), a surface of chemically strengthened glass (Gorilla II manufactured by Coming Incorporated) subjected to plasma treatment cleaning under the same conditions as in Example 3-5 was spray-coated with the surface treatment agent prepared in Example 3-5. Thereafter, curing was performed at 80° C. and 40% RH for 30 minutes to form a cured film (film thickness: about 10 nm), thereby obtaining a test specimen.

Example 3-13

A test specimen was obtained by forming a cured film (film thickness: about 10 nm) in the same manner as in Example 3-12 except that the surface treatment agent was changed to that prepared in Example 3-6.

Formation of Cured Film by Vacuum Vapor Deposition

Example 3-14

On glass (Gorilla 3 manufactured by Coming Incorporated) with $SiO_2$ applied to an outermost surface in a thickness of 15 nm, the surface treatment agent prepared in Example 3-5 was vapor-deposited in vacuum under the following conditions, and cured in an atmosphere at 25° C. and a humidity of 50% for 1 hour to form a film (film thickness: about 10 nm), and the film was used as a test specimen in the following evaluation.
[Conditions and Apparatus for Coating by Vacuum Vapor Deposition]
  Measurement apparatus: Compact vacuum vapor deposition apparatus VPC-250 F
  Pressure: $2.0 \times 10^{-3}$ Pa to $3.0 \times 10^{-2}$ Pa
  Vapor deposition temperature (ultimate temperature of boat): 500° C.
  Vapor deposition distance: 20 mm
  Amount of treatment agent applied: 5 mg
  Vapor deposition amount: 5 mg Example 3-15

A test specimen was obtained by forming a cured film (film thickness: about 10 nm) in the same manner as in Example 3-14 except that the surface treatment agent was changed to that prepared in Example 3-6.

The water-repellent property of the obtained cured film was evaluated by the following method.
[Water-repellent property]
  The contact angle of the cured film with water was measured using a contact angle meter DropMaster (manufactured by Kyowa Interface Science Co., Ltd.). The results are shown in Table 4 below.

TABLE 4

| | Dilution solvent | Coating method | Water contact angle (°) |
|---|---|---|---|
| Example 3-10 | Hexane | Dip | 105 |
| Example 3-11 | Heptane | Dip | 101 |
| Example 3-12 | Hexane | Spray | 111 |
| Example 3-13 | Heptane | Spray | 111 |
| Example 3-14 | Hexane | Vacuum vapor deposition | 107 |
| Example 3-15 | Heptane | Vacuum vapor deposition | 110 |

The invention claimed is:
1. A coating agent composition comprising a perfluoropolyether compound (A) of the following general formula (1):

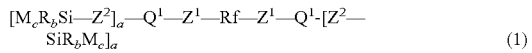
$$[M_cR_bSi-Z^2]_a-Q^1-Z^1-Rf-Z^1-Q^1-[Z^2-SiR_bM_c]_a \quad (1)$$

wherein Rf is a divalent perfluoropolyether group having a numerical average molecular weight of 1,500 to 20,000;
  each $Z^1$ is independently a divalent linking group, optionally contains an oxygen atom, a nitrogen atom, a fluorine atom or a silicon atom, and may be a group having a cyclic structure and/or an unsaturated bond;
  each $Z^2$ is independently a divalent hydrocarbon group having 2 to 20 carbon atoms, may have a cyclic structure, and optionally contains an intermediate ether bond (—O—);
  each $Q^1$ is independently a linking group with a valence of (a+1), and may have cyclic structure, the linking group having a siloxane structure with at least (a+1)

silicon atoms, an unsubstituted or halogen-substituted silalkylene structure, a silarylene structure, or a combination of two or more thereof;

each a is independently an integer of 1 to 10, each b is independently an integer of 0 to 2, each c is independently an integer of 1 to 3, and b and c on one silicon atom satisfy b+c=3; all "a" number of $Z^2$ in the square bracket in formula (1) are bonded to the silicon atom in the $Q^1$ structure;

each R is independently a monovalent hydrocarbon group having 1 to 6 carbon atoms; and each M is independently a group selected from the group consisting of an alkoxy group having 1 to 10 carbon atoms, an alkoxyalkyl group having 2 to 10 carbon atoms, an alkoxyalkoxy group having 2 to 10 carbon atoms, an acyloxy group having 1 to 10 carbon atoms, an alkenyloxy group having 2 to 10 carbon atoms, and a halogen group; and a perfluoropolyether compound (B) of the following general formula (2):

$$F—Rf'—F \quad (2)$$

wherein Rf' is a divalent perfluoropolyether group having a numerical average molecular weight of 1,500 to 20,000;

wherein the content ratio of the perfluoropolyether compound (B) is less than 2.5 mol % per a total of 100 mol % of the component (A) and the component (B), and the content of a fluorine-containing solvent having a boiling point of 260° C. or lower at normal pressure is less than 1 wt % with respect to the entire composition.

2. The coating agent composition according to claim 1, wherein the content of the perfluoropolyether compound (A) is 0.005 to 80 wt % with respect to the entire composition, the content ratio of the perfluoropolyether compound (B) is less than 1.5 parts by weight per a total of 100 parts by weight of the perfluoropolyether compound (A) and the perfluoropolyether compound (B), and the balance is a volatile organic solvent (C) free of a fluorine atom.

3. The coating agent composition according to claim 1, wherein in formulae (1) and (2), Rf and Rf' each include a repeating unit having at least one structure selected from the group of the following divalent perfluoroether groups:

—CF$_2$O—;

—CF$_2$CF$_2$O—;

—CF$_2$CF$_2$CF$_2$O—;

—CF(CF$_3$)CF$_2$O—;

—CF$_2$CF$_2$CF$_2$CF$_2$O—;

—CF$_2$CF$_2$CF$_2$CF$_2$CF$_2$O—; and

—CF$_2$CF$_2$CF$_2$CF$_2$CF$_2$CF$_2$O—, and a perfluoroalkylene group having 1 to 6 carbon atoms.

4. The coating agent composition according to claim 1, wherein in formulae (1) and (2), Rf and Rf' are each having one of:

—CF$_2$O(CF$_2$O)$_p$(CF$_2$CF$_2$O)$_q$CF$_2$—

—CF$_2$CF$_2$O(CF$_2$O)$_p$(CF$_2$CF$_2$O)$_q$CF$_2$CF$_2$— wherein p is an integer of 10 to 290, q is an integer of 5 to 170, and p+q is an integer of 15 to 295; the sequence of the repeating units of —CF$_2$O— and —CF$_2$CF$_2$O— is random; and —CF(CF$_3$)[OCF$_2$CF(CF$_3$)]$_s$O(C$_u$F$_{2u}$O)$_v$[CF(CF$_3$)CF$_2$O]$_t$CF(CF$_3$)—

—CF$_2$CF$_2$CF$_2$O[CF(CF$_3$)CF$_2$O]$_t$CF$_2$CF$_2$— wherein each of s and t is independently an integer of 1 to 120, s+t is an integer of 4 to 121, u is an integer of 1 to 6, and v is an integer of 0 to 10.

5. The coating agent composition according to any claim 1, wherein in formula (1), $Z^2$ has the following formula:

—(CH$_2$)$_w$— wherein w is an integer of 2 to 20.

6. The coating agent composition according to claim 1, wherein in formula (1), $Q^1$ is a cyclic siloxane structure.

7. The coating agent composition according to claim 1, wherein in formula (1), $Z^1$ is one selected from

—CH$_2$CH$_2$—;

—CH$_2$CH$_2$CH$_2$—;

—CH$_2$CH$_2$CH$_2$CH$_2$—;

—CH$_2$OCH$_2$CH$_2$—;

—CH$_2$OCH$_2$CH$_2$CH$_2$—

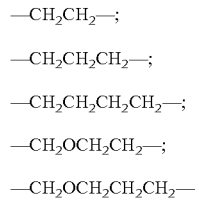

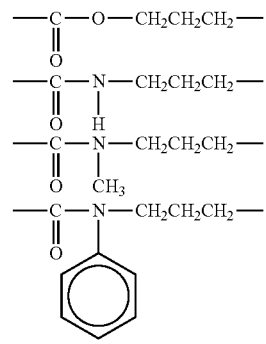

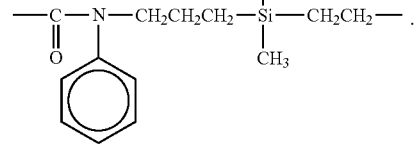

8. The coating agent composition according to claim 2, wherein the volatile organic solvent (C) free of a fluorine atom contains a nonpolar hydrocarbon-based solvent.

9. The coating agent composition according to claim 2, wherein the volatile organic solvent (C) free of a fluorine atom has a boiling point of 30 to 200° C. at normal pressure.

10. The coating agent composition according to claim 1, wherein the coating agent composition gives a cured film having a water contact angle of 100° or more.

11. A method for treating a surface of an article, comprising the step of treating the surface of the article by a dry coating method or a wet coating method using the coating agent composition according to claim 1.

12. An article having a surface subjected to anti-fouling treatment with the coating agent composition according to claim 1.

* * * * *